(12) United States Patent
Urakami

(10) Patent No.: US 8,888,301 B2
(45) Date of Patent: Nov. 18, 2014

(54) FOREIGN MATTER REMOVAL UNIT AND OPTICAL APPARATUS HAVING THE SAME

(75) Inventor: Toshifumi Urakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 13/367,204

(22) Filed: Feb. 6, 2012

(65) Prior Publication Data

US 2012/0200922 A1 Aug. 9, 2012

(30) Foreign Application Priority Data

Feb. 9, 2011 (JP) ................. 2011-026357

(51) Int. Cl.
*G02B 23/16* (2006.01)
*H04N 5/217* (2011.01)
*G02B 27/00* (2006.01)
*B08B 7/02* (2006.01)
*H01L 41/00* (2013.01)

(52) U.S. Cl.
CPC .......... *G02B 27/0006* (2013.01); *H04N 5/2171* (2013.01); *B08B 7/02* (2013.01); *H01L 41/00* (2013.01)
USPC .......................................... 359/513; 359/507

(58) Field of Classification Search
USPC ................... 359/507, 511, 513, 514; 348/335
See application file for complete search history.

(56) References Cited

U.S. PATENT DOCUMENTS

| 2007/0211162 A1* | 9/2007 | Kaihara et al. ................. 348/335 |
| 2009/0015705 A1* | 1/2009 | Urakami ........................ 348/340 |
| 2010/0110262 A1 | 5/2010 | Shirono |

FOREIGN PATENT DOCUMENTS

| CN | 1964435 A | 5/2007 |
| CN | 100368927 C | 2/2008 |
| CN | 101344641 A | 1/2009 |
| CN | 101542889 A | 9/2009 |
| CN | 101770142 A | 7/2010 |
| EP | 1783530 A1 | 5/2007 |
| EP | 2202575 A2 | 6/2010 |
| JP | 2009-17461 A | 1/2009 |
| JP | 2009-296356 A | 12/2009 |

* cited by examiner

*Primary Examiner* — William Choi
*Assistant Examiner* — Sharrief Broome
(74) *Attorney, Agent, or Firm* — Canon USA, Inc. IP Division

(57) ABSTRACT

A foreign matter removal unit includes a rectangular optical member disposed on an optical path, in which is set an optically effective region through which a light flux passes, a piezoelectric device provided to a side of the optical member on the outer side of the optically effective region, and a vibration suppression member provided to a side of the optical member where the piezoelectric device is not provided. The vibration suppression member is provided to the optical member such that an edge face of the side of the optical member does not protrude out from an edge face of the vibration suppression member.

18 Claims, 14 Drawing Sheets

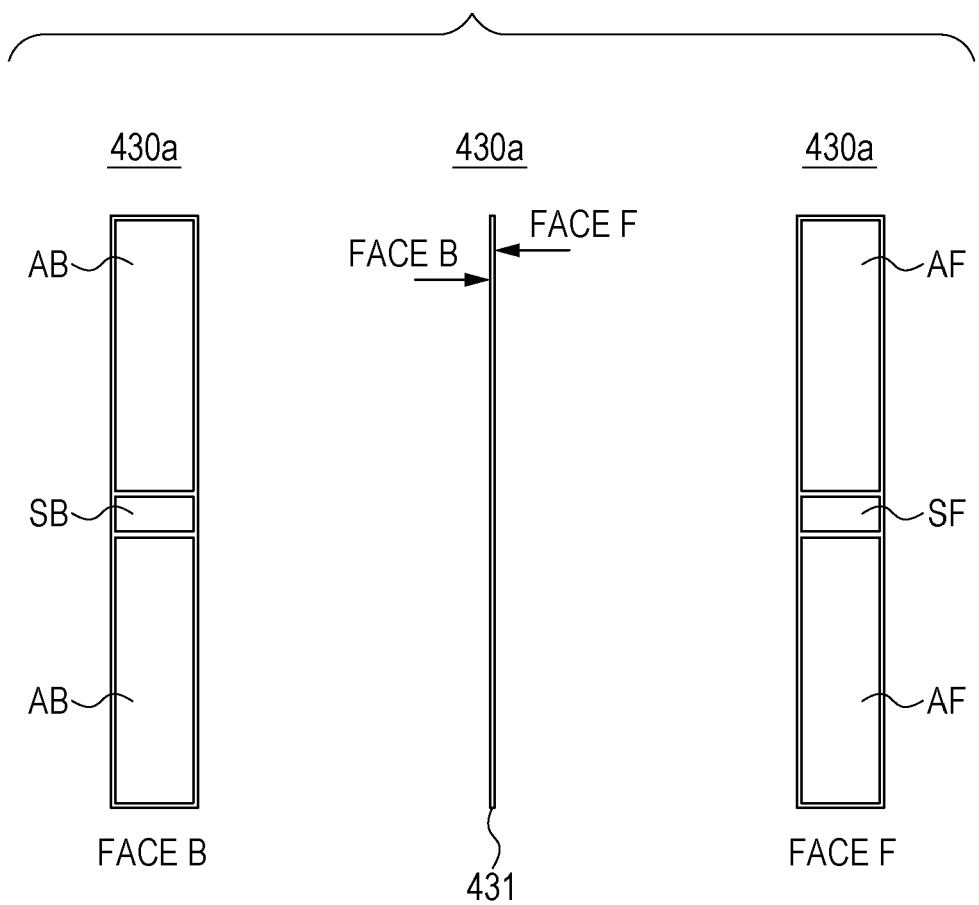

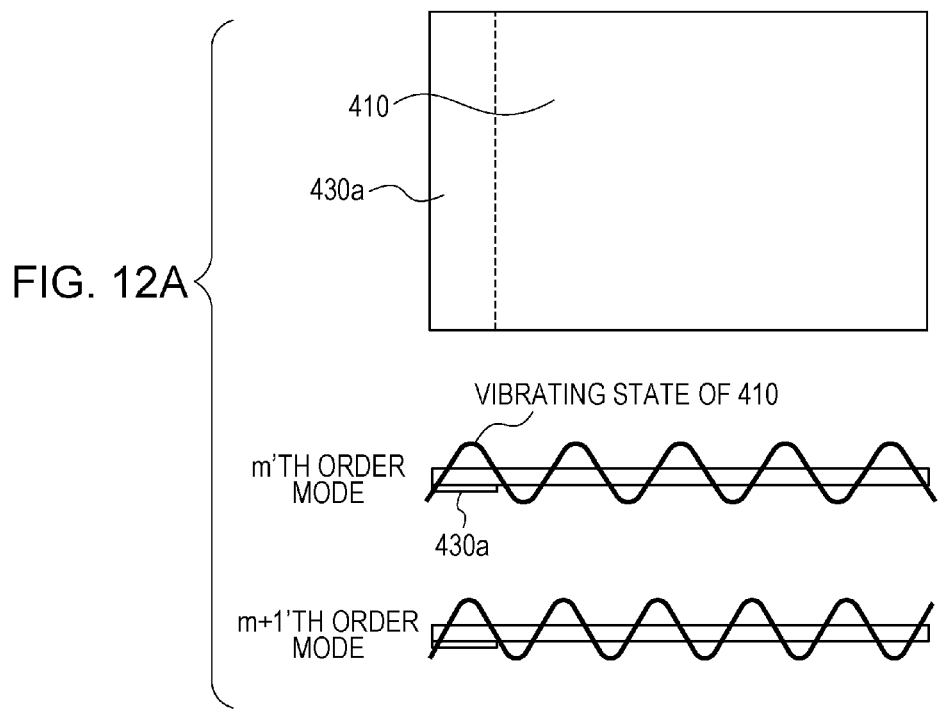

FOREIGN MATTER REMOVAL UNIT AND OPTICAL APPARATUS HAVING THE SAME

BACKGROUND OF THE INVENTION

1. Field of the Invention

The present invention relates to a foreign matter removal unit for eliminating foreign matter such as dust and the like, and an optical apparatus having the same.

2. Description of the Related Art

Optical apparatuses such as digital cameras or the like which perform imaging by converting a subject image into electrical signals receive a photography light flux with an imaging device, and convert photoelectric conversion signals output from the imaging device into image data. With such imaging apparatuses, optical low-pass filters and infrared ray absorbing filters are disposed on the subject side of the imaging device. In the event that foreign matter such as dust or the like adheres to the face of these filters, the portions in the photographed image where the adhesion has occurred appears as black spots, deteriorating the appearance of the image. Particularly, with digital single-reflex cameras with exchangeable lenses, mechanical moving parts such as the shutter and quick return mirror are disposed in close proximity to the imaging device and there are cases where foreign matter such as dust that has originated at these moving parts adheres to the surface of the imaging device or filter. Also, foreign matter such as dust may enter the camera body from the lens mount opening when exchanging lenses, and adhere to the surface of the imaging device or filter.

There is known a way to avoid such phenomena by vibrating the optical filters provided at the subject side of the imaging device using a piezoelectric device, so as to remove foreign matter such as dust which has adhered to the surface of the optical filters.

At this time, to effectively remove foreign matter such as dust, the optical filter is preferably vibrated at a resonant frequency of the optical filter by the piezoelectric device, so as to increase the amplitude of the vibrations. However, the resonant frequency differs depending on the external shape of the optical filter, the thickness thereof, physical property parameters, and so forth, so the resonant frequency for each optical filter differs due to variation in fabrication precision, manufacturing processes, and so forth.

Accordingly, with the invention disclosed in Japanese Patent Laid-Open No. 2009-17461, a piezoelectric device is disposed nearby one side of a rectangular optical filter, so as to be parallel to that side. Further, to detect the vibration state of the optical filter, one detecting electrode is disposed on the piezoelectric device separately from an electrode for driving, and one detecting ground electrode is disposed on the back face thereof. The resonant frequency is searched for while monitoring the electrode voltage thereof, the optical filter is vibrated using the found resonant frequency, and dust and the like adhering to the surface of the optical filter is removed.

SUMMARY OF THE INVENTION

An aspect of the present invention is a foreign matter removal unit including a rectangular optical member disposed on an optical path, in which is set an optically effective region through which a light flux passes; a piezoelectric device provided to a side of the optical member on the outer side of the optically effective region; and a vibration suppression member provided to a side of the optical member where the piezoelectric device is not provided, wherein the vibration suppression member is provided to the optical member such that an edge face of the side of the optical member where the vibration suppression member is provided does not protrude out from an edge face of the vibration suppression member. According to the present invention, effects of reflection of vibrations at the edge faces of the optical member can be attenuated and/or absorbed. Accordingly, vibrations for removing foreign matter can be effectively used, and foreign matter removing capabilities can be improved.

Further features of the present invention will become apparent from the following description of exemplary embodiments with reference to the attached drawings.

BRIEF DESCRIPTION OF THE DRAWINGS

FIG. 7 is a diagram for describing the configuration of a piezoelectric device.

FIG. 8A is a diagram of a configuration with two vibration suppressing members having been applied to the optical low-pass filter, and FIG. 8B is a cross-sectional diagram taken along VIIIB-VIIIB in FIG. 8A.

FIG. 10A is a diagram of a configuration with a vibration suppressing member having been applied to the optical low-pass filter, and FIG. 10B is a cross-sectional diagram taken along XB-XB in FIG. 10A.

FIGS. 12A and 12B are diagrams illustrating m order and m+1 order vibration mode forms, and voltage applied to a piezoelectric device according to the second embodiment.

FIG. 13A is a diagram of a configuration with a vibration suppressing member having been applied to the optical low-pass filter, and FIG. 13B is a cross-sectional diagram taken along XIIIB-XIIIB in FIG. 13A.

FIG. 14A is a diagram of a configuration with a vibration suppressing member having been applied to the optical low-pass filter, and FIG. 14B is a cross-sectional diagram taken along XIVB-XIVB in FIG. 14A.

DESCRIPTION OF THE EMBODIMENTS

Vibrating an optical filter generates reflections of the vibrations at the edge face of the optical filter, and the reflected vibrations and main vibrations exhibit interference. The effects of the vibration interference is manifested in irregularity in the magnitude of vibration amplitude of the optical filter, and occurrence of a vibration phase different from the phase of the main vibrations. Particularly, the effects of vibration interference are even greater when the optical filter is rectangular than circular. In the event that a vibration detecting electrode is situated at a location which experiences vibration inference, irregularity in the magnitude of electrode voltage and phase shift occur, making it difficult to accurately detect the main vibrations. In the event that main vibrations are erroneously detected, vibrations will be applied which are off from the intended frequency and phase, which impedes the capabilities to remove foreign matter from the optical filter.

Nonetheless, the invention disclosed in Japanese Patent Laid-Open No. 2009-17461 makes no mention whatsoever regarding the placement of vibration detecting electrodes taking reflected vibrations into consideration, so the capabilities to remove foreign matter from the optical filter may be impeded under the effects of reflected vibrations.

Embodiments of the present invention will be described in detail with reference to the drawings. An example of applying the present invention to a digital camera will be described as an example of an optical apparatus having a foreign matter removal unit.

First Embodiment

Figure 1:
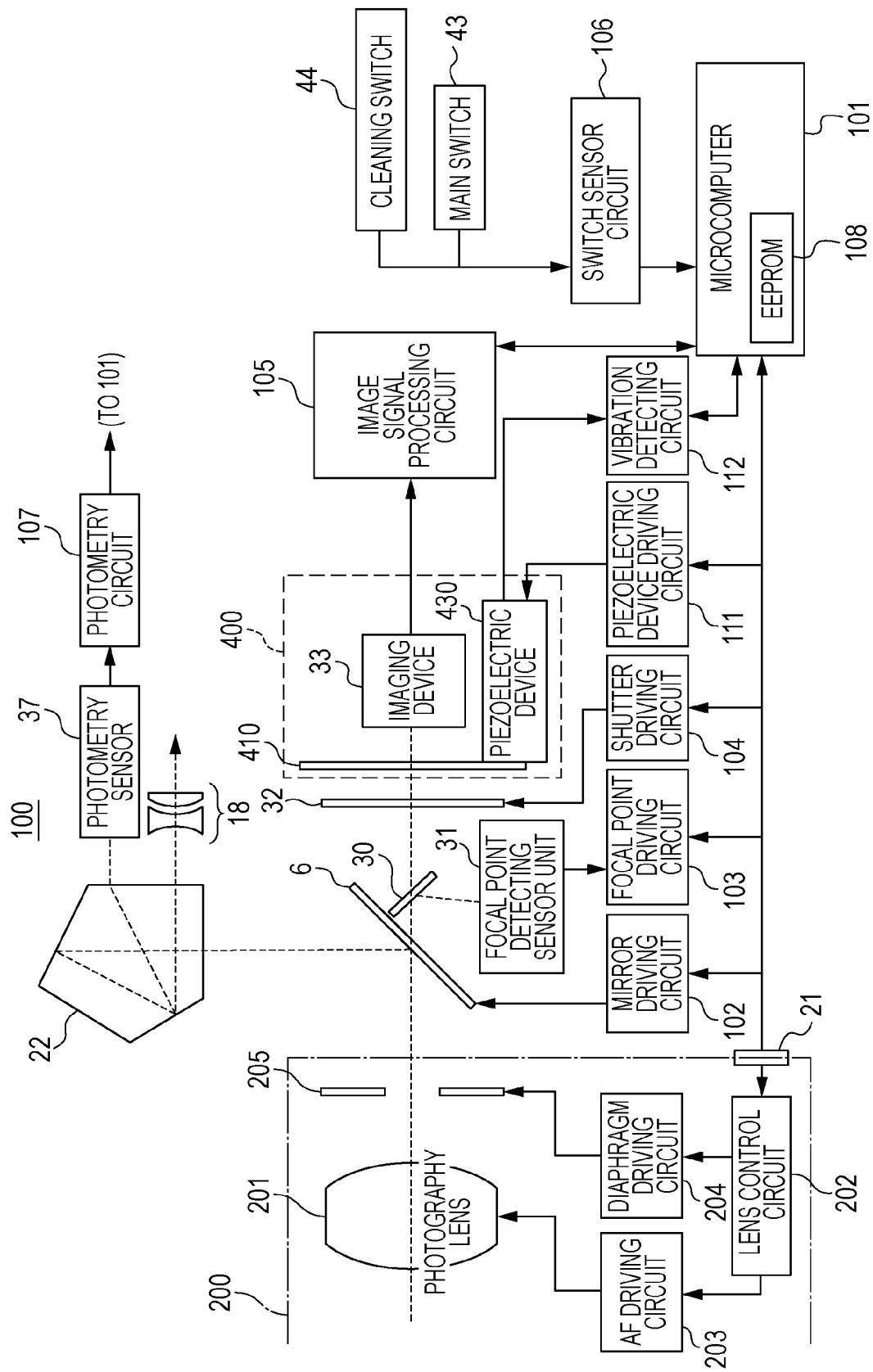
FIG. 1 is a block diagram illustrating the functional configuration of a digital camera according to an embodiment of the present invention.

FIG. 1 is a block diagram illustrating the functional configuration of a digital camera 100 according to a first embodiment. A microcomputer (hereinafter abbreviated to "MPU") 101 is a central processing unit, for example, which controls the operations of each block which the digital camera 100 has. Connected to the MPU 101 are a mirror driving circuit 102, a focal point driving circuit 103, a shutter driving circuit 104, an image signal processing circuit 105, a switch sensor circuit 106, a photometry circuit 107, a piezoelectric device driving circuit 111, and a vibration detecting circuit 112. these circuits operate under the control of the MPU 101.

The MPU 101 performs communication with a lens control circuit 202 within an imaging lens unit 200 via a mount point 21. Upon the imaging lens unit 200 being connected, the MPU 101 receives signals via the mount point 21, and thereby determines that communication can be made with the lens control circuit 202 of the imaging lens unit 200. The lens control circuit 202 receives control signals from the MPU 101, and thus drives an imaging lens 201 within the imaging lens unit 200 and a diaphragm 205 by way of an AF driving circuit 203 and a diaphragm driving circuit 204. Note that while only one imaging lens 201 is illustrated in FIG. 1 to facilitate illustration, in reality the imaging lens 201 is configured of a great number of lens groups such as focusing lenses and the like.

The AF driving circuit 203 has a stepping motor for example, and focuses a photography light flux on an imaging device 33 by changing the focus lens position within the imaging lens 201 by controlling the lens control circuit 202. The diaphragm driving circuit 204 is a diaphragm mechanism such as an automatic iris for example, and changes the aperture of the diaphragm 205 under control of the lens control circuit 202.

A main mirror 6 guides the imaging light flux passing through the imaging lens 201 to a pentaprism 22 while being maintained at an angle 45° as to the imaging optical axis shown in FIG. 1, and also transmits a portion thereof, which is guided to a sub mirror 30. The sub mirror 30 guides the photography light flux which has passed through the main mirror 6 to a focal point detecting sensor unit 31.

The mirror driving circuit 102 is configured of a DC motor and gear train for example, and drives the main mirror 6 to a position where a subject image is observable through the viewfinder and a position retracted from the photography light flux. Upon the main mirror 6 being driven, at the same time, the sub mirror 30 also moves to the position for guiding the photography light flux to the focal point detecting sensor unit 31 and the position retracted from the photography light flux.

The focal point detecting sensor unit 31 is configured of a field lens disposed near an unshown imaging plane, a reflecting mirror, a secondary imaging lens, a diaphragm, a line sensor made up of multiple CCDs, and so forth, and performs phase difference focal point detection. Signals output from the focal point detecting sensor unit 31 are supplied to the focal point driving circuit 103 converted into subject image signals, and then transmitted to the MPU 101.

The MPU 101 performs focal point detection computation by phase difference detection based on the subject image signals. Specifically, the MPU 101 calculates the amount and direction of defocusing subject image signals, and drives the focusing lens within the imaging lens 201 to the focal point position by way of the lens control circuit 202 and AF driving circuit 203, following the defocusing amount and direction thereof that has been calculated.

The pentaprism 22 performs conversion reflection of the photography light flux reflected at the main mirror 6 into a normal erect image. Accordingly, the photographer can observe the subject image through a viewfinder eyepiece window 18 via a viewfinder optical system. Also, the pentaprism 22 guides a portion of the photography light flux to a photometry sensor 37. The photometry circuit 107 converts the photography values output from the photometry sensor 37 into luminance signals of each area on the observation plane, and outputs to the MPU 101. The MPU 101 calculates exposure value based on the luminance signals.

A shutter unit 32 is a mechanical focal plane shutter for example, and at the time of the photographer observing a subject image via the viewfinder eyepiece window 18, the leading blade of the shutter is in a shielding position, and the trailing blade of the shutter is at the exposure position. Also, when shooting, the leading blade performs exposure scanning of moving from the shielding position to an exposing position, thereby allowing the photography light flux to pass through, and the later-described imaging device 33 performs imaging by performing photoelectric conversion of the subject image that has been imaged thereupon. After a set shutter time has elapsed, the trailing blade performs shielding scanning of moving from the exposing position to the shielding position, thereby completing shooting for one piece of image data. Note that the shutter unit 32 is controlled by the shutter driving circuit 104 which has received control commands from the MPU 101.

The image signal processing unit 105 performs A/D conversion processing on analog image signals output from the imaging device 33, and further performs various types of image processing on the digital image data obtained thereby, such as noise removal processing, gain adjustment processing, and so forth. The switch sensor circuit 106 transmits to the MPU 101 input signals input by the photographer operating a user inter face which the digital camera 100 has, including a main switch 43, cleaning switch 44, and so forth. The cleaning switch 44 is a user interface for giving instruction for removal of foreign matter such as dust and the like which has adhered to the surface of an optical low-pass filter 410, and removal of foreign matter on the filter can be manually performed by the photographer operating the cleaning switch 44.

An imaging unit 400 serving as a foreign matter removal unit is a unitized block of parts including the optical low-pass filter 410, piezoelectric device 430, and imaging device 33. The imaging device 33 is an imaging device such as a CMOS sensor or CCD or the like for example, and as described above outputs analog image signals by performing photoelectric conversion of a light image of a subject that has been imaged thereupon. The piezoelectric device 430 is a single-chip piezoelectric device for example, and is configured so as to be vibrated by the piezoelectric device driving circuit 111 which has received control signals from the MPU 101, and transmit the vibrations to the optical low-pass filter 410.

Structure for Foreign Matter Removal

Figure 2:
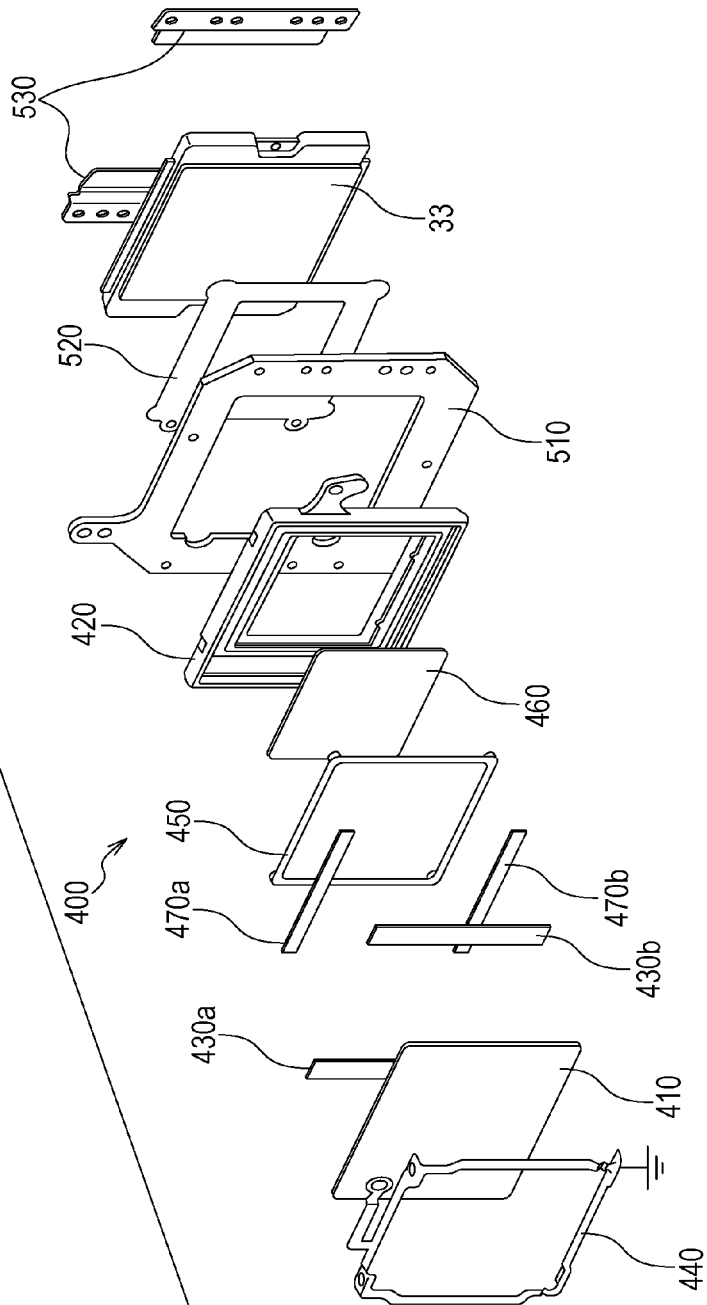
FIG. 2 is a perspective view schematically illustrating the configuration of an imaging unit.

Now, the imaging unit 400 serving as a foreign matter removal unit which performs removal of foreign matter on the optical low-pass filter 410 by vibration thereof will be described in further detail with reference to FIG. 2. FIG. 2 is a disassembled perspective view schematically illustrating the configuration of the imaging unit 400.

The optical low-pass filter 410 disposed in front of the imaging device 33 is a single birefringent plate formed of a crystal, rectangular in shape. The optical low-pass filter 410 is a rectangular optical member placed upon the optical path, and the optically effective region where the light flux passes through is set. The optical low-pass filter 410 has a perimeter portion where a pair of piezoelectric devices 430a and 430b are disposed on the outer side of the optically effective region, and directions orthogonal to the photography optical axis (the right and left directions of the camera) are symmetrical. The surface of the optical low-pass filter 410 configured this is coated with an optical coating for cutting out infrared rays, reflection prevention, and so forth.

The piezoelectric devices 430a and 430b are each integrally formed of multiple electrodes upon a single piezoelectric member, as described later, having a strip-shaped external form. Each is disposed following respective short ends of the optical low-pass filter 410 which face one another. More specifically, the piezoelectric devices 430a and 430b are applied to the perimeter portion of the optical low-pass filter 410 such that the long side of the piezoelectric device 430a which is a first piezoelectric device is parallel to one short side (one side) of the optical low-pass filter 410, and the long side of the piezoelectric device 430b which is a second piezoelectric device is parallel to the other short side (other side) of the optical low-pass filter 410.

The optical low-pass filter 410 is vibrated in waves such that multiple nodes and antinodes are formed parallel to the sides thereof. Cyclic voltage is applied to the piezoelectric devices 430a and 430b, so that the piezoelectric devices 430 exhibit expansion and contraction. The optical low-pass filter 410 also exhibits cyclic flexing deformation accordingly. Details of the vibration will be described later.

An optical low-pass filter retaining member 420 is formed of resin or metal, and regains the optical low-pass filter 410. The optical low-pass filter retaining member 420 is fixed by screws to an imaging device retaining member 510.

A pressing member 440 presses the optical low-pass filter 410 toward the imaging device 33. The pressing member 440 is retained at the optical low-pass filter retaining member 420. The pressing member 440 is electrically connected to a ground portion of the digital camera 100. The front of the optical low-pass filter 410 is also electrically connected to the ground portion of the digital camera 100. Thus, electrostatic adhesion of dust and the like to the face of the optical low-pass filter 410 can be suppressed.

A sealing member 450 has a generally circular frame-shaped cross-sectional form, and is sandwiched between the optical low-pass filter 410 and the optical low-pass filter retaining member 420. Due to the pressing member 440 pressing the optical low-pass filter 410, the sealing member 450 is compressed between the optical low-pass filter 410 and optical low-pass filter retaining member 420. Accordingly, the force with which the sealing member 450 is compressed is determined by the pressing force of the pressing member 440 in the direction toward the imaging device 33. Note that the sealing member 450 may be formed of rubber, or urethane foam such as PORON.

An optical member 460 is an optical member where a phase plate (depolarization plate), an infrared cutting filter, and a birefringent plate of which the direction of refraction is 90° shifted from that of the optical low-pass filter 410, have been layered. The optical member 460 is fixed by adhesion to the optical low-pass filter retaining member 420.

Vibration suppression members 470a and 470b are strip-shaped elastic members. The vibration suppression members 470a and 470b are applied to the optical low-pass filter 410 by double-sided tape outside of the optically effective region, so as to cover the long sides of the optical low-pass filter 410. Due to the vibration suppression members 470a and 470b being applied to the optical low-pass filter 410 so as to cover the long sides of the optical low-pass filter 410, reflecting vibrations off of the edge faces of the optical low-pass filter 410 can be suppressed.

The imaging device retaining member 510 has a rectangular opening formed, and the imaging device 33 is fixed to the opening with the imaging device 33 exposed. The imaging device retaining member 510 is fixed to the body of the digital camera 100 by screws or the like.

A mask 520 is held between the optical low-pass filter retaining member 420 and imaging device 33 to prevent excessive light from the photography light path from entering the imaging device 33.

Imaging device pressing members 530 are a pair of left and right plate spring like pressing members. The imaging device pressing members 530 are fixed by screws to the imaging device retaining member 510, and press the imaging device 33 against the imaging device retaining member 510. Due to the above-described configuration, the optical low-pass filter 410 is sandwiched between the pressing member 440 and the sealing member 450 so as to be capable of vibrating.

Description of Vibration

Next, Description of vibrations occurring at the optical low-pass filter 410 according to the present embodiment will be described with reference to FIGS. 3 through 6. With the present embodiment, traveling waves traveling in the direction of the long sides of the optical low-pass filter 410 (horizontal directions in the drawings) are generated at the optical low-pass filter 410. That is to say, two flexural vibrations differing in order by 1 are generated by excitation at the optical low-pass filter 410 with the time phase shifted, thereby generating traveling waves at the optical low-pass filter 410.

Figure 3:
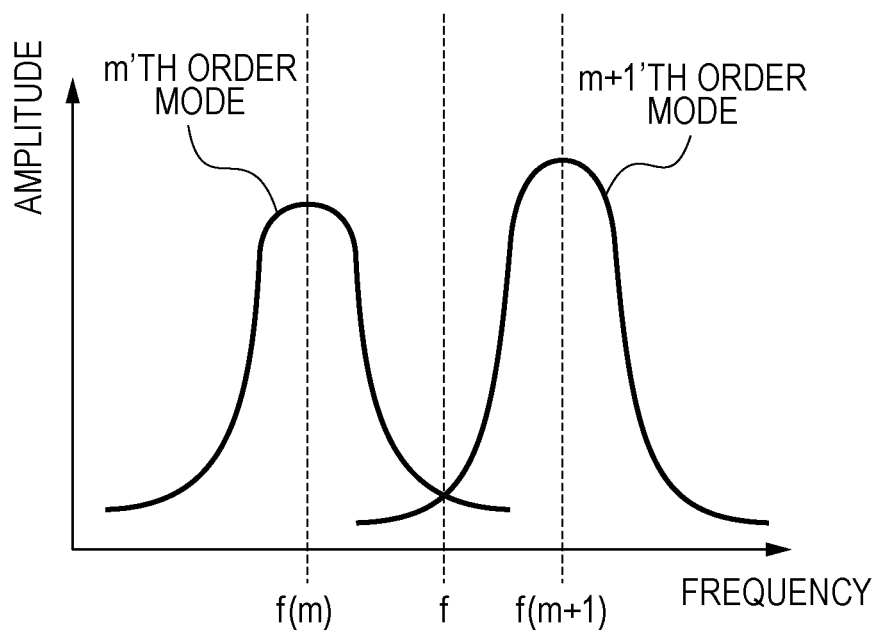
FIG. 3 is a graph illustrating the relation between flexural vibration frequency and amplitude with two vibration modes from excitation at an optical low-pass filter in a first embodiment.
Figure 4:
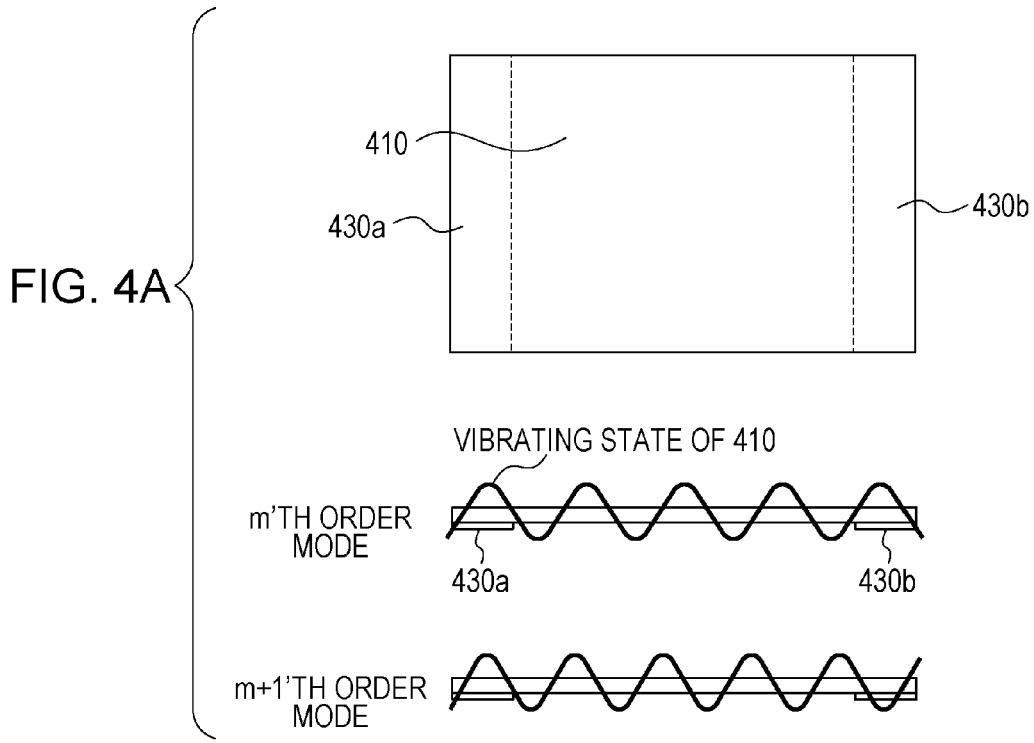
FIGS. 4A and 4B are diagrams illustrating m order and m+1 order vibration mode forms, and voltage applied to two piezoelectric devices according to the first embodiment.

FIG. 3 is a graph illustrating the relation between frequency and amplitude with two vibrations modes generated by excitation at the optical low-pass filter 410 according to the present embodiment. As shown in FIG. 3, flexural vibrations of an m'th order vibration mode are generated by excitation with a frequency indicated by f(m), and flexural vibrations of an m+1'th order vibration mode are generated by excitation of a frequency indicated by f(m+1). Now, if we set the frequency f of the voltage to be applied to the piezoelectric devices 430a and 430b such that f(m)<f<f(m+1), both the resonance of the flexural vibrations of the m'th order vibration mode and the resonance of the flexural vibrations of the m+1'th order vibration mode can be used. In the event that f is set such that f<f(m), resonance of the vibrations of the m'th order vibration mode can be used, but it becomes difficult to use resonance of the vibrations of the m+1'th order vibration mode, due to being too far from the resonance point in the f(m+1) vibration mode. Also, in the event that f is set such that f(m+1)<f, only use resonance of the flexural vibrations of the m+1'th order vibration mode can be used. With the present embodiment, the frequency f is set within a range of f(m)<f<f (m+1), so as to use resonance in both vibrating modes.

FIGS. 4A and 4B are diagram illustrating the waveforms of m and m+1'th order vibration modes in the event that m is an odd number, and voltage applied to the piezoelectric devices 430a and 430b. As an example of a case where m is an odd number, FIGS. 4A and 4B illustrate a case where m=9. FIG. 4A is a diagram viewing the optical low-pass filter 410 from the main mirror 6 side. The piezoelectric devices 430a and 430b are applied to the face of the optical low-pass filter 410 at the side toward the imaging device 33.

As shown in FIG. 4A, in the longitudinal direction of the optical low-pass filter 410, multiple nodes are observed at equal intervals in the longitudinal direction of the piezoelectric device 430 in the flexural vibrations of the respective vibration modes. FIG. 4B represents the amplitude and time phase of AC current applied to the piezoelectric devices 430a and 430b in the flexure vibrations in the respective vibration modes, by real component and imaginary component. (1) in FIG. 4B illustrates AC voltage of the flexure vibration in the m'th order vibration mode. (2) in FIG. 4B illustrates AC voltage in the m+1'th order vibration mode. (3) in FIG. 4B illustrates AC voltage of the flexure vibration in the m+1'th order vibration mode in the case of shifting the time phase by 90°. Note that here, in order to detect the same amplitude in the flexure vibrations of the two vibration modes, the voltage of the flexure vibrations in each vibration mode is stipulated to the amplitude of the flexure vibrations in the m'th order vibration mode, with the amplitude ratio between the flexure vibrations of the m'th order vibration mode and the flexure vibrations of the m+1'th order vibration mode as A:1. In order to generate by excitation at the optical low-pass filter 410 flexure vibrations of the m'th order vibration mode and flexure vibrations of the m+1'th order vibration mode at the same time, all that is necessary is to add the AC voltage of (1) and (3) in FIG. 4B, i.e., to apply the AC voltage of (4) in FIG. 4B. Now, the flexure vibrations of the m'th order vibration mode are equivalent to first flexure vibrations, and the flexure vibrations of the m+1'th order vibration mode are equivalent to second flexure vibrations of which the time phase is 90° shifted as to the first flexure vibrations.

Figure 5:
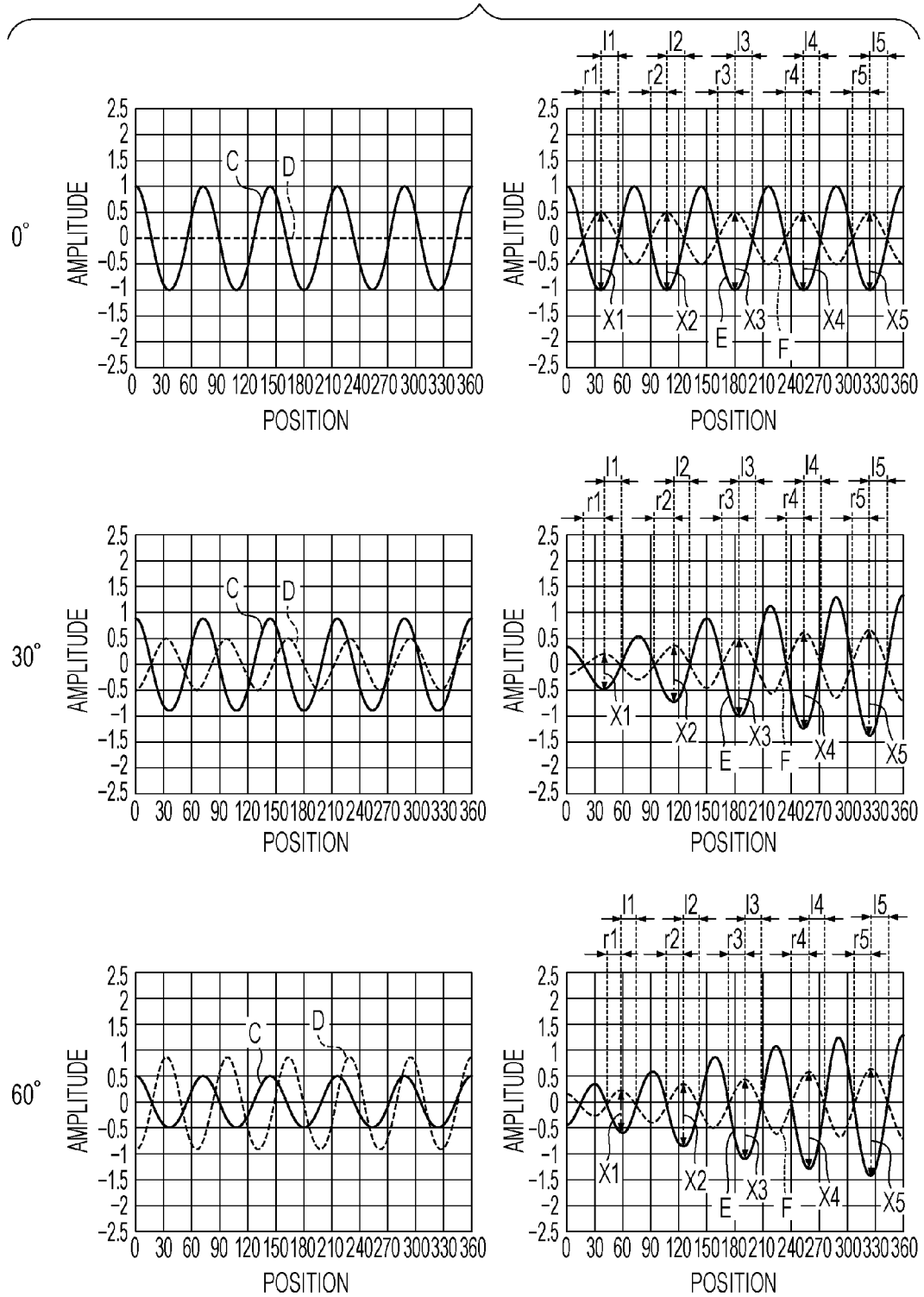
FIG. 5 is a diagram for describing the behavior of the optical low-pass filter in a case of generating flexural vibration of two vibration modes by excitation at the same time.
Figure 6:
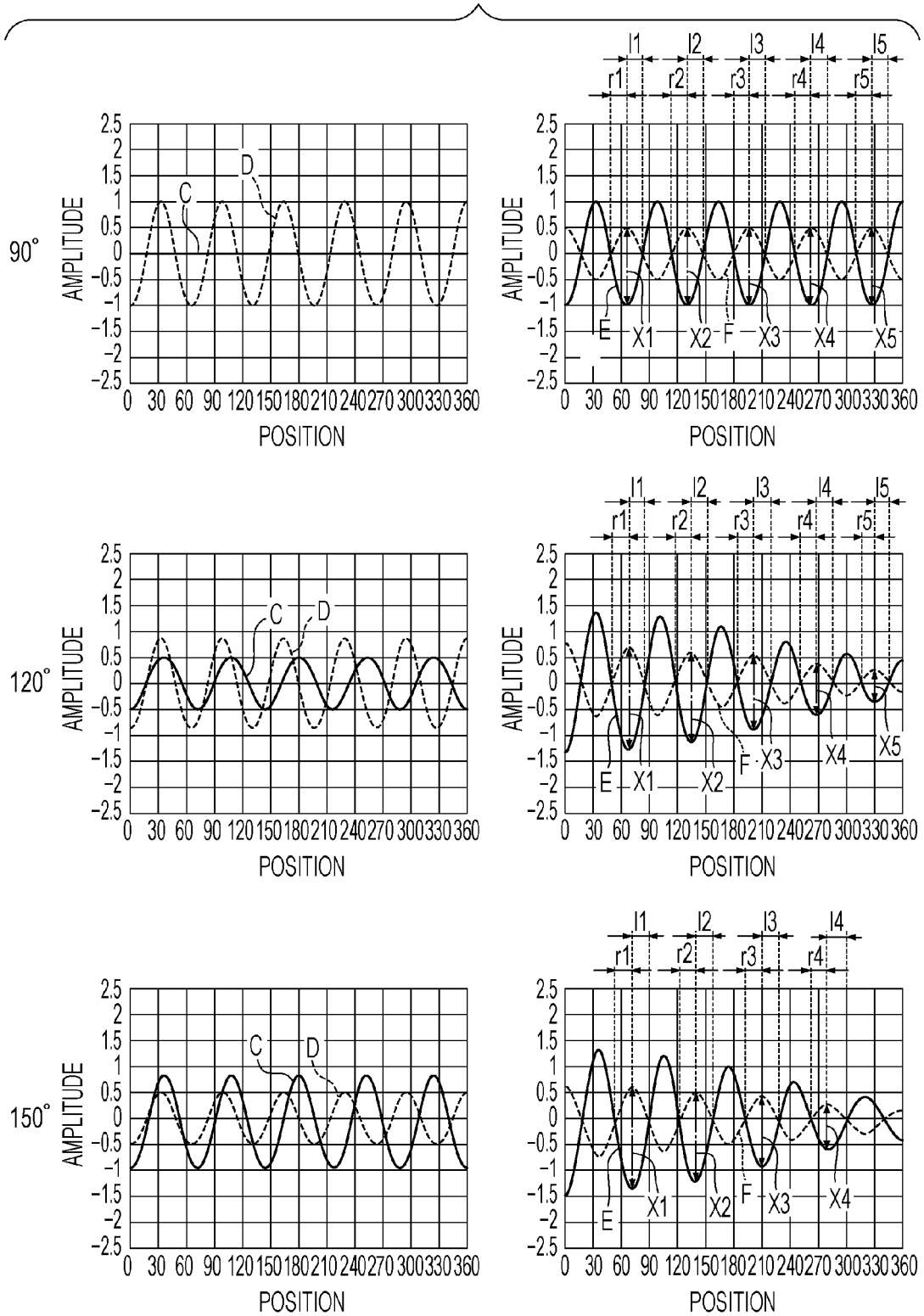
FIG. 6 is a diagram for describing the behavior of the optical low-pass filter in a case of generating flexural vibration of two vibration modes by excitation at the same time.

Next, description will be made regarding the behavior of the optical low-pass filter 410 in the case of generating by excitation flexure vibrations of two vibration modes at the same time according to the control method described above. With the present embodiment, a case will be considered regarding excitation for a 9th order mode and 10th order mode. FIGS. 5 and 6 illustrate the behavior of the optical low-pass filter 410 at each time phase, in a case of excitation flexure vibrations of two vibration modes at the same time with the time phase shifted by 90°. The horizontal axis in the drawings represents the position within the optical low-pass filter 410, representing from the left edge to the right edge with the numerical values of 0 through 360. Also, we will say that the longitudinal direction of the optical low-pass filter 410 is X, the traverse direction is Y, and the normal direction of the plane is Z. In FIGS. 5 and 6, C represents the waveform of the 9th order flexure vibrations for the vibration mode, and D represents the waveform of the 10th order flexure vibrations for the vibration mode. Also, E represents a composite waveform of the flexure vibrations of the two vibration modes. That is to say, E represents the actual amplitude of the optical low-pass filter 410 F represents the Z-directional acceleration of the optical low-pass filter 410.

Foreign matter which has adhered to the surface of the optical low-pass filter 410 travels under the force in the normal direction, due to the optical low-pass filter 410 being deformed. That is to say, if we say that the curve F representing acceleration in the Z direction has a positive value, the foreign matter is upthrusted, and is subjected to force in the normal direction of the curve E indicating displacement of the optical low-pass filter 410 in this time phase. In the section indicated by rn (where n=1, 2, 3 . . . ), the foreign matter is subjected to force in the right direction (positive direction in the X direction). In the section indicated by ln (where n=1, 2, 3 . . . ), the foreign matter is subjected to force in the left direction (negative direction in the X direction). As a result, the foreign matter moves to a location indicated by Xn (where n=1, 2, 3 . . . ). With the present embodiment, the foreign matter travels in the positive direction of X by the Xn (n=1, 2, 3 . . . ) moving in the positive direction as the time phase progresses.

Electrode Placement of Piezoelectric Devices

Next, FIG. 7 is a diagram describing the configuration of the piezoelectric device 430a. FIG. 7 is a three-view drawing of the piezoelectric device 430a. As illustrated in FIG. 7, the piezoelectric device 430a is configured from a piezoelectric member 431 which is a piezoelectric device, and four types of electrodes, which are a driving electrode AF, a driving electrode AB, a sensor electrode SF, and a ground electrode SB, formed on the face of the piezoelectric member 431.

As shown in FIG. 7, two driving electrodes AF and one sensor electrode SF are formed on an F face (first face) of the piezoelectric member 431. That is to say, multiple driving electrodes are formed on the F face (first face) of the piezoelectric member. Two driving electrodes AB and one ground electrode SB are formed on a B face (second face) of the piezoelectric member 431. The two driving electrodes AF and the two driving electrodes AB are each formed so as to correspond to each other's position on the front and back sides of the piezoelectric member 431. The two driving electrodes AF and the two driving electrodes AB are driving electrodes for generating vibrations by excitation of the optical low-pass filter 410.

The piezoelectric device driving circuit 111 which is a control circuit alternately applies voltage to the two driving electrodes AF and the two driving electrodes AB, thereby causing the optical low-pass filter 410 to vibrate.

The sensor electrode SF is a vibration detecting electrode to detect vibrations of the optical low-pass filter 410. The sensor electrode SF is formed between the two driving electrodes AF on the F face (first face) of the piezoelectric member 431. The ground electrode SB is electrically connected to a portion of the digital camera 100 which is of ground potential, i.e., a ground. The ground electrode SB is formed between the two driving electrodes AB on the B face (second face) of the piezoelectric member 431. The sensor electrode SF and the ground electrode SB are each formed so as to correspond to each other's position on the front and back sides of the piezoelectric member 431.

The sensor electrode SF monitors how the output voltage which the sensor electrode SF generates changes as to the ground electrode SB which is at ground voltage, to detect vibrations of the optical low-pass filter 410.

The driving electrodes AF, driving electrodes AB, sensor electrode SF, and ground electrode SB are connected to an unshown flexible printed circuit for piezoelectric devices, by thermal compression bonding using an ACF (anisotropic conductive film). The driving electrodes AF and driving electrodes AB are connected to the piezoelectric device driving circuit 111 via a wiring pattern of the flexible printed circuit for piezoelectric devices. The sensor electrode SF which is a vibration detecting electrode is connected to the vibration detecting circuit 112 via a wiring pattern of the flexible printed circuit for piezoelectric devices. The ground electrode SB is connected to a ground potential portion of the digital camera 100 via a wiring pattern of the flexible printed circuit for piezoelectric devices.

The piezoelectric device 430a thus configured is applied to the optical low-pass filter 410 such that the F face or B face of the piezoelectric member 431 is against the optical low-pass filter 410, so that the long sides of the piezoelectric device 430a are parallel to one short side (one side) of the optical low-pass filter 410. It should also be noted that the piezoelectric device 430b is configured in the same way as with the piezoelectric device 430a. The piezoelectric device 430b is applied to the optical low-pass filter 410 such that the F face or B face of the piezoelectric member 431 is against the optical low-pass filter 410, so that the long sides of the piezoelectric device 430b are parallel to the other short side (other side) of the optical low-pass filter 410.

Position of Sensor Electrode

Figure 8A:
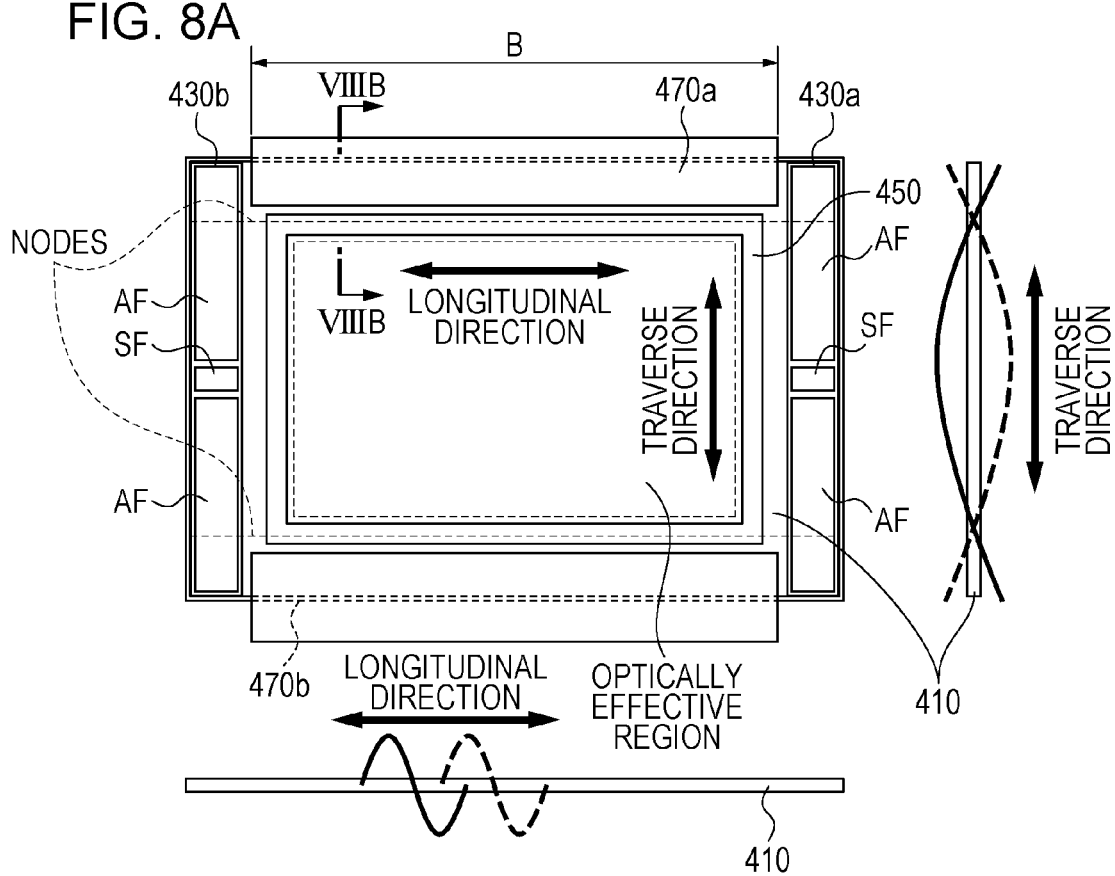
FIGS. 8A and 8B are diagrams illustrating a first embodiment, where

Next, description will be made regarding the position of the sensor electrodes SF each formed to the piezoelectric devices 430a and 430b at the time of applying the piezoelectric devices 430a and 430b to the optical low-pass filter 410. FIG. 8A is a diagram of the state in which the B faces of the piezoelectric devices 430a and 430b have been applied to the face of the optical low-pass filter 410 on the imaging device side, as viewed from the imaging device side. As shown in FIG. 8A, the piezoelectric device 430a is applied to the optical low-pass filter 410 so that the long sides of the piezoelectric device 430a are parallel to one short side (one side) of the optical low-pass filter 410. The length of the long sides of the piezoelectric device 430a and the length of the one short side (one side) of the optical low-pass filter 410 are approximately the same. As shown in FIG. 8A, the piezoelectric device 430a is applied to the optical low-pass filter 410 so that the long sides of the piezoelectric device 430b are parallel to the other short side (other side) of the optical low-pass filter 410. The length of the long sides of the piezoelectric device 430b and the length of the other short side (other side) of the optical low-pass filter 410 are approximately the same.

As described above, the optical low-pass filter 410 is vibrated with frequency f (f(m)<f<f(m+1)) to transport foreign matter. At this time, the frequency f must be a frequency whereby traveling waves most suitable for transportation are generated by excitation between f(m) through f(m+1).

FIG. 8A is a schematic diagram of traveling waves at a frequency f. FIG. 8A is a diagram viewing just the optical low-pass filter 410 and piezoelectric devices 430a and 430b from the imaging device side.

As shown in FIG. 8A, traveling waves are generated by excitation which travel in the longitudinal direction of the optical low-pass filter 410, i.e., in a direction orthogonal to the short sides of the optical low-pass filter 410 where the piezoelectric devices 430a and 430b are applied. At this time, standing waves of a 1st order vibration mode such as illustrated in FIG. 8A occur in the traverse direction of the optical low-pass filter 410. The dotted lines in FIG. 8A indicate the nodes of the 1st order standing waves. One each of the nodes of the 1st order standing waves appear in the traverse direction of the optical low-pass filter 410 symmetrically across the center axis of the traverse direction of the optical low-pass filter 410. The 1st order standing wave is a standing wave occurring at a frequency between the frequency f (m) (m'th order vibration mode) and the frequency f (m+1) (m+1'th order vibration mode).

The foreign matter which has adhered to the face of the optical low-pass filter 410 is transported in the longitudinal direction of the optical low-pass filter 410 by the composite waves of the traveling waves traveling in the longitudinal direction of the optical low-pass filter 410 and the 1st order standing waves occurring in the traverse direction of the optical low-pass filter 410.

The amplitude of the composite waves transporting the foreign matter are the greatest at the center axis of the traverse direction of the optical low-pass filter 410, where is situated the antinode of the 1st order standing waves occurring in the traverse direction of the optical low-pass filter 410. The amplitude of the composite waves transporting the foreign matter becomes smaller the farther away from the center axis of the traverse direction of the optical low-pass filter 410 and the closer to portions corresponding to the nodes of the 1st order standing waves occurring in the traverse direction of the optical low-pass filter 410. The amplitude of the composite waves transporting the foreign matter is the smallest at portions corresponding to the nodes of the 1st order standing waves occurring in the traverse direction of the optical low-pass filter 410. Accordingly, there is the possibility that sufficient amplitude to transport foreign matter may not be obtained at the portions corresponding to the nodes of the 1st order standing waves occurring in the traverse direction of the optical low-pass filter 410.

With the present embodiment, the nodes of the 1st order standing waves are made to occur outside the optically effective region by optimizing the size of the optical low-pass filter. That is to say, the size of the optical low-pass filter is set such that 1st order standing waves occur outside the optically effective region. Accordingly, sufficient amplitude for transporting the foreign matter can be obtained within the optically effective region of the optical low-pass filter 410.

Traveling waves traveling in the longitudinal direction of the optical low-pass filter 410 reflect at the edge of the long sides of the optical low-pass filter 410, i.e., at the edges of the optical low-pass filter 410 where the piezoelectric devices 430a and 430b are not applied. Accordingly, vibrations occur other than the 1st order standing waves generated in the traverse direction of the optical low-pass filter 410.

The reflected waves occurring at the edge of the long sides of the optical low-pass filter 410 exhibit interference with the composite waves transporting the foreign matter. This interference causes irregularity in the magnitude of amplitude of the composite waves near the long sides of the optical low-pass filter 410, leading to vibrations of a phase different from the phase of the composite waves transporting the foreign matter. Accordingly, if the sensor electrode SF is positioned further out from the nodes of the 1st order standing wave occurring in the traverse direction of the optical low-pass filter 410, the sensor electrode SF cannot accurately detect the composite waves transporting the foreign matter. On the other hand, if the sensor electrode SF is positioned upon a node of the 1st order standing wave occurring in the traverse direction of the optical low-pass filter 410, distinguishing between vibrations and noise becomes difficult since the amplitude of the composite waves transporting the foreign matter is small.

Accordingly, the piezoelectric devices 430 and 430*b* are applied to the optical low-pass filter 410 such that the sensor electrode SF is situated between the nodes of the of the 1st order standing wave occurring in the traverse direction of the optical low-pass filter 410. That is to say, the sensor electrode SF is positioned between multiple nodes of the vibrations occurring in the traverse direction of the optical low-pass filter 410 where the piezoelectric devices 430*a* and 430*b* are applied. With the present embodiment, the position of the sensor electrode SF is upon the center axis of the traverse direction of the optical low-pass filter 410. Accordingly, the sensor electrode SF can detect the composite waves where the amplitude is greatest, so distinguishing between vibrations and noise becomes easy. Also, the closer to the center axis of the traverse direction of the optical low-pass filter 410, the smaller the effects of reflected waves occurring at the edges of the long sides of the optical low-pass filter 410 are. Thus, by positioning the sensor electrode SF upon the center axis of the traverse direction of the optical low-pass filter 410, the composite waves transporting the foreign matter can be detected accurately.

Also, with the present embodiment, as shown in FIG. 8A, the strip-shaped vibration suppression members 470*a* and 470*b* are applied to the optical low-pass filter 410 such that the long sides thereof are parallel to the long sides of the optical low-pass filter 410. Also, as shown in FIG. 8A, a sealing member 450 is positioned in a region outside of the optically effective region of the optical low-pass filter 410. The piezoelectric devices 430*a* and 430*b* are applied to a region outside of the sealing member 450 in the longitudinal direction of the optical low-pass filter 410. The vibration suppression members 470*a* and 470*b* are applied to a region on the outer side of the sealing member 450 in the traverse direction of the optical low-pass filter 410. That is to say, the vibration suppression member 470*a* is applied to the optical low-pass filter 410 so as to be parallel to the upper long side of the optical low-pass filter 410. The vibration suppression member 470*b* is applied to the optical low-pass filter 410 so as to be parallel to the lower long side of the optical low-pass filter 410. As shown in FIG. 8A, the length B of the long sides of the vibration suppression members 470*a* and 470*b* is longer than the length of the long side of the optically effecting region set for the optical low-pass filter 410. The vibration suppression members 470*a* and 470*b* are applied to the optical low-pass filter 410 such that the optically effective region of the optical low-pass filter 410 is situated within the range of the long sides of the vibration suppression members 470*a* and 470*b*.

At this time, the edge faces of the long side of the vibration suppression member 470*a* on the outer side protrudes out from the edge face of the long sides of the optical low-pass filter 410, and the edge face of the long side of the vibration suppression member 470*a* on the inner side is situated further outside from the nodes of the 1st order standing wave occurring in the traverse direction of the optical low-pass filter 410. That is to say, the vibration suppression member 470*a* is applied to the optical low-pass filter 410 such that the edge face of the vibration suppression member 470*a* protrudes out from the edge face of the optical low-pass filter 410.

In the same way, the edge face of the long side of the vibration suppression member 470*b* on the outer side protrudes out from the edge face of the long side of the optical low-pass filter 410, and the long side of the vibration suppression member 470*b* on the inner side is situated further outside from the nodes of the 1st order standing wave occurring in the traverse direction of the optical low-pass filter 410. That is to say, the vibration suppression member 470*b* is applied to the optical low-pass filter 410 such that the edge face of the vibration suppression member 470*b* protrudes out from the edge face of the optical low-pass filter 410.

Figure 8B:
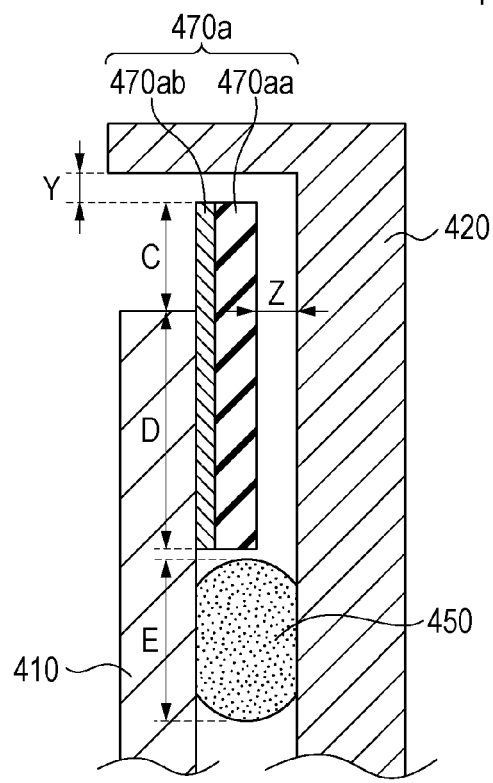

FIG. 8B is a cross-sectional diagram taken along VIIIB-VIIIB in FIG. 8A. FIG. 8B illustrates, in addition to the optical low-pass filter 410 and piezoelectric devices 430*a* and 430*b*, a portion of the optical low-pass filter retaining member 420 in FIG. 8A.

As illustrated in FIG. 8B, the vibration suppression member 470*a* is configured of an elastic member 470*aa* and double-sided tape 470*ab*. The elastic member 470*aa* and double-sided tape 470*ab* are of the same shape, with one face of the double-sided tape 470*ab* being applied to one entire face of the elastic member 470*aa*. The other face of the double-sided tape 470*ab* is applied to the optical low-pass filter 410. Upon the other face of the double-sided tape 470*ab* being applied to the optical low-pass filter 410, the edge face of the vibration suppression member 470*a* protrudes from the edge face of the optical low-pass filter 410 by a protrusion amount C, as shown in FIG. 8B.

At this time, a protrusion amount C of $C \geq 0$ is sufficient. That is to say, the vibration suppression member 470*a* may be applied to the optical low-pass filter 410 such that the protrusion amount $C=0$, i.e., so that the edge of the long side of the optical low-pass filter 410 and the long side of the vibration suppression member 470*a* are on the same plate. However, in the case of manufacturing with a process where a pre-cut vibration suppression member 470*a* is applied onto the optical low-pass filter 410, the edge face of the optical low-pass filter 410 may undesirably protrude from the edge face of the vibration suppression member 470*a* due to irregularity in parts and in assembly precision. In the event that the edge face of the optical low-pass filter 410 protrudes from the edge face of the vibration suppression member 470*a* (when protrusion amount $C<0$), the reflected waves are not sufficiently attenuated at the edge of the optical low-pass filter 410 and cause interference with the composite waves transporting the foreign matter.

Accordingly, in the event of manufacturing with a process where a pre-cut vibration suppression member 470*a* is applied onto the optical low-pass filter 410, the edge face of the vibration suppression member 470*a* preferably protrudes from the edge face of the optical low-pass filter 410 (protrusion amount $C>0$).

In the case of manufacturing with a process where the vibration suppression member 470*a* is cut after applying the vibration suppression member 470*a*, formed sufficiently greater than the optical low-pass filter 410, to the optical low-pass filter 410, the vibration suppression member 470*a* can be cut such that protrusion amount $C=0$. In this case, the vibration suppression member 470*a* can be cut such that the edge face of the optical low-pass filter 410 does not protrude from the edge face of the vibration suppression member 470*a*, so protrusion amount $C=0$ is permissible.

By forming such that the edge face of the vibration suppression member 470*a* protrudes from the edge face of the optical low-pass filter 410 (protrusion amount $C>0$), the adhesive face of the double-sided tape 470*ab* is exposed to the outside of the optical low-pass filter 410, as illustrated in FIG. 8B. That is to say, an adhesive face is also formed on a region of the vibration suppression member 470*a* protruding out from the edge face of the optical low-pass filter 410. Accordingly, the foreign matter removed form the face of the optical low-pass filter 410 can be captured at the exposed adhesive face of the double-sided tape 470*ab*, thereby yielding an advantage that the foreign matter removed from the face of the optical low-pass filter 410 does not scatter.

When the optical low-pass filter 410 is held by the optical low-pass filter retaining member 420, the sealing member 450 is compressed between the optical low-pass filter 410 and the optical low-pass filter retaining member 420, as illustrated in FIG. 8B, whereby the width of the sealing member 450 becomes E. At this time, a clearance Y (Y>0) and a clearance Z (Z>0) such as shown in FIG. 8B are formed between the vibration suppression member 470*a* and the optical low-pass filter retaining member 420. That is to say, the optical low-pass filter retaining member 420 holds the optical low-pass filter 410 so as to not come into contact with the vibration suppression member 470*a*. This is because in the event that the vibration suppression member 470*a* comes into contact with a material having a high Young's modulus such as resin or metal or the like, i.e., a hard material, the reflected waves generated at the edge of the optical low-pass filter 410 are not sufficiently attenuated and/or absorbed by the elastic member 470*aa*. Note that in the event that the edge face of the vibration suppression member 470*a* protrudes from the edge face of the optical low-pass filter 410 (protrusion amount C>0), the clearance Y may be 0.

Also, in the event that the optical low-pass filter retaining member 420 is a material with a small Young's modulus such as urethane foam or rubber material, i.e., a soft material, the clearance Y and clearance Z may each be 0. That is to say, the optical low-pass filter retaining member 420 may be allowed to come into contact with the vibration suppression member 470*a*. This is because a material with a small Young's modulus, i.e., a soft material, will not impede the effects of the elastic member 470*aa* attenuating and/or absorbing reflected waves.

In the same way as with the vibration suppression member 470*a*, the vibration suppression member 470*b* is configured of an elastic member 470*ba* and double-sided tape 470*bb*. The elastic member 470*ba* and double-sided tape 470*bb* are of the same shape, with one face of the double-sided tape 470*bb* being applied to one entire face of the elastic member 470*ba*. Making a protrusion amount C' of the vibration suppression member 470*b*, which has been applied so as to be parallel with the lower long side of the optical low-pass filter 410, to be greater than the protrusion amount C of the vibration suppression member 470*a* allows foreign matter falling gravitationally from the face of the optical low-pass filter 410 to be effectively captured. The adhesion amount D of the vibration suppression member 470*a* as to the optical low-pass filter 410 illustrated in FIG. 8B should be decided taking into consideration the necessary adhesive force and ease of assembly. This holds true for the vibration suppression member 470*b* as well.

The elastic member 470*aa* is preferably formed of a material with a small Young's modulus, i.e., a soft material, such as urethane foam such as PORON, elastomer, a rubber member, silicone rubber, or the like. A common adhesive tape will suffice for the double-sided tape 470*ab*, with conceivable examples of adhesive agent including acrylic adhesive agents, silicone adhesive agents, rubber adhesive agents, and so forth. The double-sided tape 470*ab* functions to attenuate the vibrations reflecting at the edge face of the optical low-pass filter 410, and to efficiently transmit these reflected waves to the elastic member 470*aa*. Note that while both-sided adhesive tape is employed with the present embodiment for the sake of workability, the present invention is not restricted to this arrangement, and the same advantages can be obtained using a soft paste adhesive agent.

Thus, applying the vibration suppression members 470*a* and 470*b* to the optical low-pass filter 410 allows the reflected waves reflecting at the edge of the optical low-pass filter 410 to be attenuated. That is to say, the vibrations reflected at the edges of the long sides of the optical low-pass filter 410 can be attenuated and/or absorbed at the elastic members 470*aa* and 470*ba* via the double-sided tape 470*ab* and 470 *bb*. By attenuating and/or absorbing vibrations reflecting at the edge of the optical low-pass filter 410, composite waves transporting foreign matter can be effectively used, and the capabilities of removing foreign matter adhering to the face of the optical low-pass filter 410 can be improved.

Detection of Vibrating State

Figure 9:
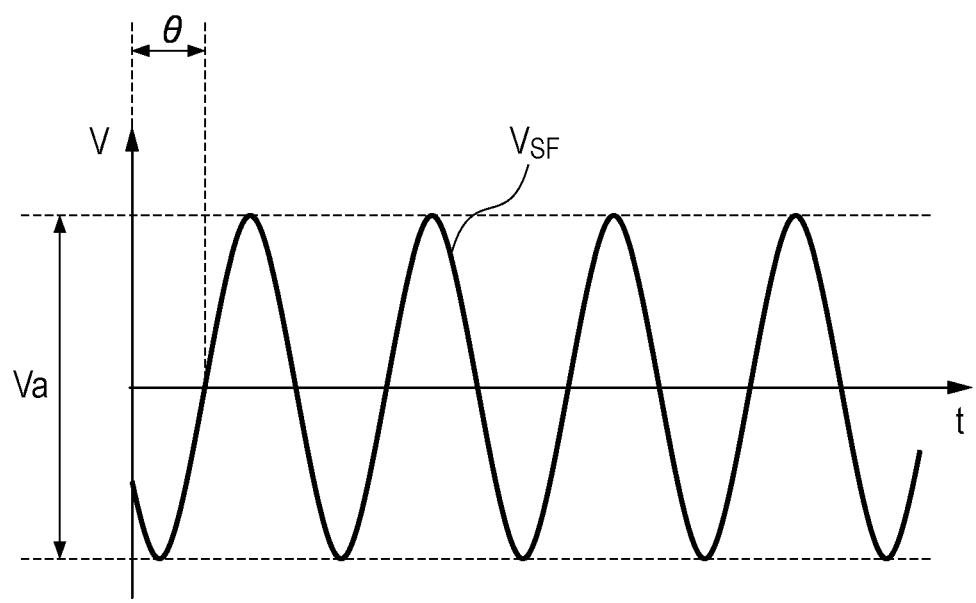
FIG. 9 is a diagram describing a detected waveform detected by a vibration detecting circuit when the optical low-pass filter is vibrated at a frequency f.

Detection of the vibrating state of the optical low-pass filter 410 will be described with reference to FIG. 9. FIG. 9 illustrates the detected waveform detected by the vibration detecting circuit 112 in the event of vibrating the optical low-pass filter 410 with a frequency f. The vibration detecting circuit 112 is a circuit for detecting potential difference due to expansion and compression of the piezoelectric member 431.

Sine wave voltage occurs at the sensor electrode SF due to piezoelectric effect in accordance with vibrations of the optical low-pass filter 410. At this time, the ground electrode SB is constantly maintained at ground voltage (0 V), so the sine waveform VSF illustrated in FIG. 9 is obtained from the vibration detecting circuit 112. The potential difference Va detected here is proportionate to the amplitude of the optical low-pass filter 410. The phase θ detected at this time represents the vibration phase of the optical low-pass filter 410. Accordingly, the composite waves occurring at the optical low-pass filter 410 can be detected by monitoring the output voltage waveform. The voltage and voltage frequency applied to the piezoelectric devices 430*a* and 430*b* can be controlled as feedback such that the potential difference Va and phase θ are predetermined values, thereby generating desired transporting vibrations.

Also, detection of malfunctioning or abnormalities can be performed. For example, in the event that the potential difference Va detected by the vibration detecting circuit 112 is markedly different from what is expected, the vibrations of the optical low-pass filter 410 can be assumed to be abnormal. Accordingly, this can be handled by stopping operations of the foreign matter removal unit and replacing the unit, or the like.

Modification of First Embodiment

Next, a modification of the above-described first embodiment will be described with reference to FIGS. 10A and 10B. In the same way as with FIG. 8A, FIG. 10A is a diagram of the state in which the B faces of the piezoelectric devices 430*a* and 430*b* have been applied to the imaging device side face of the optical low-pass filter 410, as viewed from the imaging device side.

With the first embodiment illustrated in FIGS. 8A and 8B, the vibration suppression member 470*a* is applied above the sealing member 450, and the vibration suppression member 470*b* is applied below the sealing member 450. In comparison, with the modification shown in FIGS. 10A and 10B, the sealing member 450, vibration suppression member 470*a*, and vibration suppression member 470*b*, illustrated in the first embodiment, are integrally formed as a vibration suppression member 570. Other points are the same as with the first embodiment, and accordingly description thereof will be omitted.

Figure 10A:
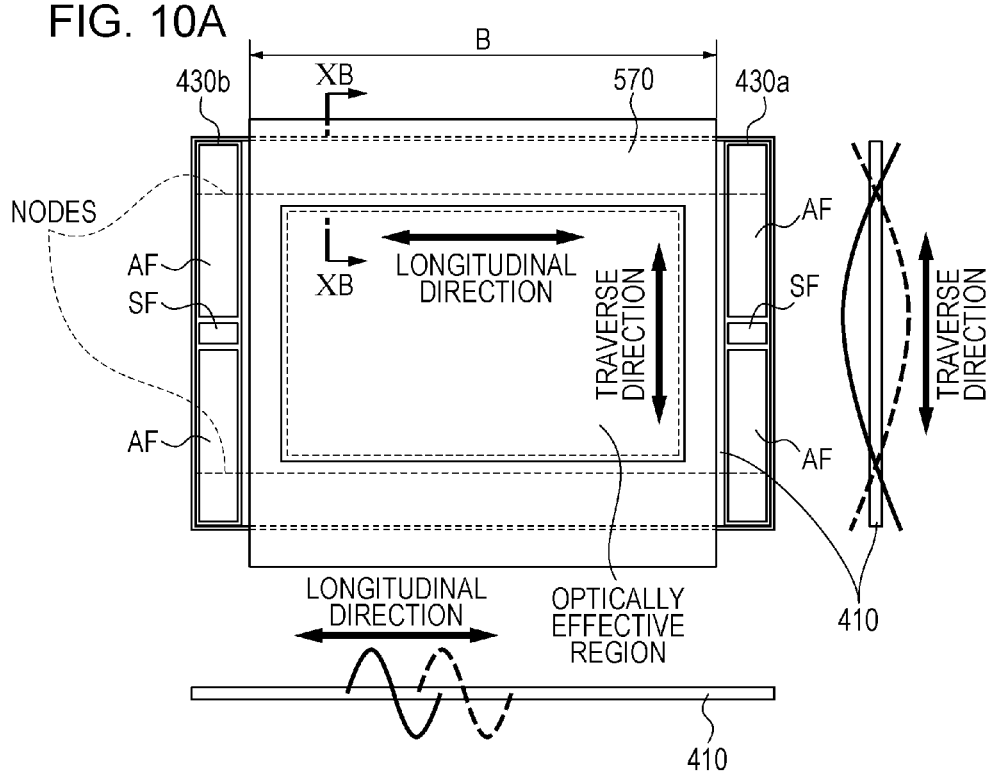
FIGS. 10A and 10B are diagrams illustrating a modification of the first embodiment, where

As illustrated in FIG. 10A, the vibration suppression member 570 has a rectangular shape with an opening formed therein. The vibration suppression member 570 is applied to the optical low-pass filter 410 by double-sided adhesive tape.

The vibration suppression member 570 is formed such that the length of the short side is longer than the short side of the optical low-pass filter 410, and the size of the opening formed in the vibration suppression member 570 is greater than the optically effective region. The length B of the long side of the vibration suppression member 570 is longer than the length of the long side of the optically effective region set to the optical low-pass filter 410.

Upon applying the vibration suppression member 570 to the optical low-pass filter 410 such that the optically effective region of the optical low-pass filter 410 is situated within the opening of the vibration suppression member 570, the edge faces of the long sides of the vibration suppression member 570 each protrude from the edge faces of the long sides of the optical low-pass filter 410.

The vibration suppression member 570 is sandwiched between the optical low-pass filter 410 and optical low-pass filter retaining member 420 and is compressed therebetween, whereby the optically effective region of the optical low-pass filter 410 is sealed off.

Figure 10B:
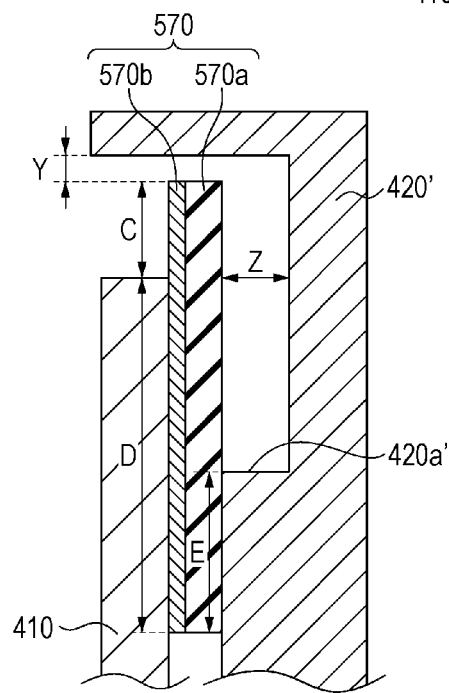

FIG. 10B is a cross-sectional diagram taken along XB-XB in FIG. 10A. FIG. 10B illustrates, in addition to the optical low-pass filter 410 and piezoelectric devices 430a and 430b, a portion of an optical low-pass filter retaining member 420', as illustrated in FIG. 10A. The optical low-pass filter retaining member 420' has a protrusion 420a' formed on the face thereof retaining the optical low-pass filter 410, and holds the optical low-pass filter 410 by this protrusion 420a' coming into contact with a part of the vibration suppression member 570.

As illustrated in FIG. 10B, the vibration suppression member 570 is configured of an elastic member 570a and double-sided tape 570b. The elastic member 570a and double-sided tape 570b are of the same shape, with one face of the double-sided tape 570b being applied to one entire face of the elastic member 570a. The other face of the double-sided tape 570b is applied to the optical low-pass filter 410. Upon the other face of the double-sided tape 570b being applied to the optical low-pass filter 410, the edge face of the vibration suppression member 570 protrudes from the edge face of the optical low-pass filter 410 by a protrusion amount C, as shown in FIG. 10B. The protrusion amount C and adhesion amount D are the same as with the first embodiment, so description will be omitted.

As illustrated in FIG. 10B, the portion of the adhesion amount D where the protrusion 420a' comes into contact has the same function as the sealing member 450 in the first embodiment.

A clearance Y (Y>0) and a clearance Z (Z>0) such as shown in FIG. 10B are formed between the vibration suppression member 570 and the optical low-pass filter retaining member 420'. That is to say, the optical low-pass filter retaining member 420' holds the optical low-pass filter 410 such that the vibration suppression member 570 and optical low-pass filter retaining member 420' do not come into contact in the vicinity of the side of the optical low-pass filter 410 where the vibration suppression member 570 is applied. This is because in the event that the vibration suppression member 570 comes into contact with a material having a high Young's modulus such as resin or metal or the like, i.e., a hard material, the reflected waves generated at the edge of the optical low-pass filter 410 are not sufficiently attenuated and/or absorbed by the elastic member 570a. Note that in the event that the edge face of the vibration suppression member 570 protrudes from the edge face of the optical low-pass filter 410 (protrusion amount C>0), the clearance Y may be 0.

Also, in the event that the optical low-pass filter retaining member 420' is a material with a small Young's modulus such as urethane foam or rubber material, i.e., a soft material, the clearance Y and clearance Z may each be 0. That is to say, the optical low-pass filter retaining member 420' may be allowed to come into contact with the vibration suppression member 570. This is because a material with a small Young's modulus, i.e., a soft material, will not impede the effects of the elastic member 570a attenuating and/or absorbing reflected waves.

Second Embodiment

A second embodiment of the present invention will now be described in detail with reference to the drawings. With the above-described first embodiment, traveling waves traveling in the longitudinal direction of the optical low-pass filter 410 are generated at the optical low-pass filter 410. Instead of this, with the second embodiment, standing wages are generated in the longitudinal direction of the optical low-pass filter 410, i.e., in the direction orthogonal to the short side of the optical low-pass filter 410 where the piezoelectric device 430a is applied. With the present embodiment, standing waves are generated in the longitudinal direction of the optical low-pass filter 410, whereby foreign matter is flicked away in the normal direction of the optical low-pass filter 410, thereby removing the foreign matter.

Figure 11:
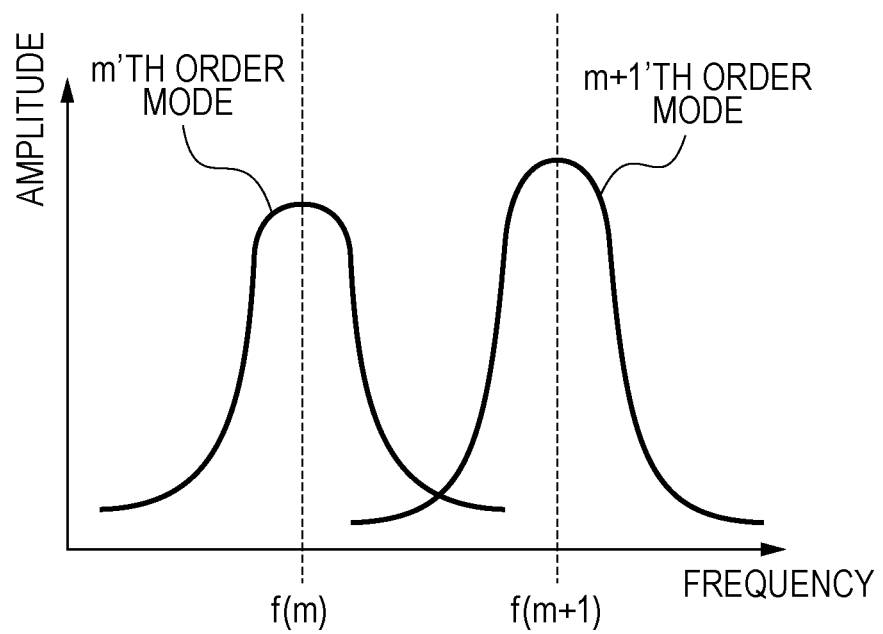
FIG. 11 is a graph illustrating the relation between the frequency and amplitude of two standing waves generated due to excitation at the optical low-pass filter in a second embodiment.

FIG. 11 is a graph illustrating the relation between frequency and amplitude with two vibrations modes generated by excitation at the optical low-pass filter 410 according to the present embodiment. As shown in FIG. 11, flexural vibrations of an m'th order vibration mode are generated by excitation with a frequency indicated by f(m), and flexural vibrations of an m+1'th order vibration mode are generated by excitation of a frequency indicated by f(m+1). Now, if we set the frequency f of the voltage to be applied to the piezoelectric device 430a such that f=f(m) and f=f(m+1), the resonance of the m'th order vibration mode and the resonance of the m+1'th order vibration mode can be used.

FIGS. 12A and 12B are diagram illustrating the waveforms of m and m+1'th order vibration modes in the event that m is an odd number, and voltage applied to the piezoelectric devices 430a and 430b. As an example of a case where m is an odd number, FIGS. 12A and 12B illustrate a case where m=9. FIG. 12A is a diagram viewing the optical low-pass filter 410 from the main mirror 6 side. The piezoelectric device 430a is applied to the face of the optical low-pass filter 410 at the side toward the imaging device 33.

As shown in FIG. 12A, in the longitudinal direction of the optical low-pass filter 410, multiple nodes are observed at equal intervals in the longitudinal direction of the piezoelectric device 430 in the flexural vibrations of the respective vibration modes. FIG. 12B represents the amplitude of AC current applied to the piezoelectric devices 430a and 430b in the flexure vibrations in the respective vibration modes, by real component and imaginary component. (1) in FIG. 12B illustrates AC voltage of the flexure vibration in the m'th order vibration mode. (2) in FIG. 12B illustrates AC voltage of the flexure vibration in the m+1'th order vibration mode. Note that in order to detect the same amplitude in the flexure vibrations of the two vibration modes, the voltage of the flexure vibrations in each vibration mode is stipulated to the amplitude of the flexure vibrations in the m'th order vibration mode, with the amplitude ratio between the flexure vibrations of the m'th order vibration mode and the flexure vibrations of the m+1'th order vibration mode as A:1.

Two standing waves with different orders are generated in the optical low-pass filter 410 by alternately applying the applied voltage (1) and (2). Specifically, a first standing wave is generated by generating by excitation of the optical low-pass filter 410 flexure vibrations of the m'th order vibration mode at a frequency of f(m). Also, a second standing wave is generated by generating by excitation of the optical low-pass filter 410 flexure vibrations of the m+1'th order vibration mode at a frequency of f(m+1). By alternating this, foreign matter adhering to the face of the optical low-pass filter 410 can be flicked away, and the foreign matter can be removed.

By generating two standing waves of which the order differs by 1 at the optical low-pass filter 410, even in the event that there is foreign matter adhering upon a node of the first standing wave, this can be removed by vibration of the optical low-pass filter 410 at the second standing wave. That is to say, by using vibration modes of even nodes and odd nodes with adjacent orders causes the nodes to appear at different positions, improving the effects of foreign matter removal.

Also, the number of standing waves to be used is not restricted to two, and three standing waves with adjacent orders, such as frequency f=f(m), f(m+1), and f(m+2) may be alternately generated, or a greater number of standing waves may be alternately generated.

Figure 13A:
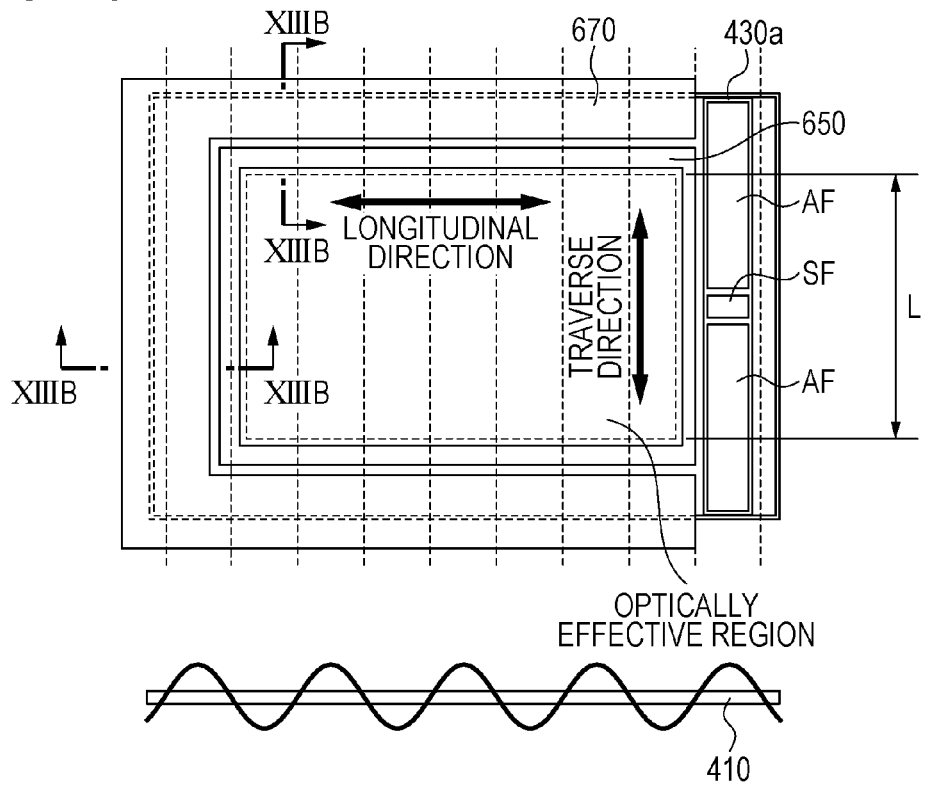
FIGS. 13A and 13B are diagrams illustrating the second embodiment, where

FIG. 13A is a diagram of the state in which the B faces of the piezoelectric device 430a has been applied to the imaging device side of the optical low-pass filter 410, as viewed from the imaging device side. As shown in FIG. 13A, the piezoelectric device 430a is applied to the optical low-pass filter 410 so that the long sides of the piezoelectric device 430a follow one short side (one side) of the optical low-pass filter 410. The length of the long sides of the piezoelectric device 430a and the length of the short side of the optical low-pass filter 410 are approximately the same.

FIG. 13A illustrates a schematic diagram of flexure vibrations in the vibration mode where frequency f=f(m). As an example of a case where m is an odd number, FIG. 13A illustrates a case where m=9.

As shown in FIG. 13A, standing waves are generated by excitation in the longitudinal direction of the optical low-pass filter 410, i.e., in a direction orthogonal to the short sides of the optical low-pass filter 410 where the piezoelectric device 430a is applied. The dotted lines in FIG. 13A indicate the nodes of the standing waves. In the same way as with the first embodiment, 1st order standing waves are generated in the traverse direction of the optical low-pass filter 410. However, in the event of generating standing waves in the longitudinal direction, the amplitude of the 1st order standing waves generated in the traverse direction is vastly smaller as compared with the amplitude of the 1st order standing waves generated in the longitudinal direction. Accordingly, in the case of generating standing waves in the longitudinal direction, the amplitude of the standing waves generated in the longitudinal direction are almost unchanged by the amplitude of the first order standing wave generated in the traverse direction.

Standing waves generated in the longitudinal direction of the optical low-pass filter 410 reflect at the edge of the long sides of the optical low-pass filter 410, i.e., at the edges of the optical low-pass filter 410 where the piezoelectric devices 430a and 430b are not applied. Accordingly, irregularities occur in the vibrations of the standing waves near the long sides of the optical low-pass filter 410, and vibrations of a phase other than the phase of the standing waves occur. Accordingly, if the sensor electrode SF is positioned near the edges of the long sides of the optical low-pass filter 410, the sensor electrode SF cannot accurately detect the standing waves generated in the longitudinal direction of the optical low-pass filter 410.

Accordingly, the piezoelectric device 430 is applied to the optical low-pass filter 410 such that the sensor electrode SF is situated within a range of the optically effective region in the traverse direction of the optical low-pass filter 410, indicated by L in FIG. 13A. With the present embodiment, the position of the sensor electrode SF is upon the center axis of the traverse direction of the optical low-pass filter 410. Thus, the effects of reflected waves generated at the edges of the long sides in the optical low-pass filter 410 can be minimized.

Also, as illustrated in FIG. 13A, a vibration suppression member 670 is applied to the optical low-pass filter 410 so as to cover the two long sides of the optical low-pass filter 410 and the one short side of the optical low-pass filter 410 to which the piezoelectric device 430a is not applied. As shown in FIG. 13A, the vibration suppression member 670 is applied to the optical low-pass filter 410 such that the three inner sides are situated on the outer side of a sealing member 650, and the outer three sides are each protruding from the three sides of the optical low-pass filter 410. That is to say, the edge faces of the outer sides of vibration suppression member 670 each protrude from the edge faces of the sides of the optical low-pass filter 410.

Figure 13B:
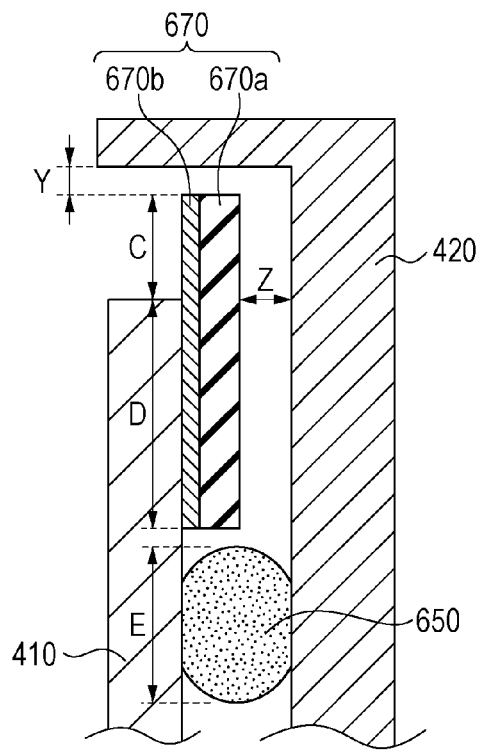

FIG. 13B is a cross-sectional diagram taken along XIIIB-XIIIB in FIG. 13A. FIG. 13B illustrates, in addition to the optical low-pass filter 410 and piezoelectric devices 430a and 430b shown in FIG. 13A, a portion of the optical low-pass filter retaining member 420.

As illustrated in FIG. 13B, the vibration suppression member 670 is configured of an elastic member 670a and double-sided tape 670b. The elastic member 670a and double-sided tape 670b are of the same shape, with one face of the double-sided tape 670b being applied to one entire face of the elastic member 670a. The other face of the double-sided tape 670b is applied to the optical low-pass filter 410. Upon the other face of the double-sided tape 670b being applied to the optical low-pass filter 410, the edge face of the vibration suppression member 670 protrudes from the edge face of the optical low-pass filter 410 by a protrusion amount C, as shown in FIG. 13B. The protrusion amount C and adhesion amount D are the same as with the first embodiment, so description will be omitted.

As illustrated in FIG. 13B, when the optical low-pass filter 410 is held by the optical low-pass filter retaining member 420, the sealing member 650 is compressed between the optical low-pass filter 410 and the optical low-pass filter retaining member 420, whereby the width of the sealing member 650 becomes E. At this time, a clearance Y (Y>0) and a clearance Z (Z>0) such as shown in FIG. 13B are formed between the vibration suppression member 670 and the optical low-pass filter retaining member 420. That is to say, the optical low-pass filter retaining member 420 holds the optical low-pass filter 410 so as to not come into contact with the vibration suppression member 670. This is because in the event that the vibration suppression member 670 comes into contact with a material having a high Young's modulus such as resin or metal or the like, i.e., a hard material, the reflected waves generated at the edge of the optical low-pass filter 410 are not sufficiently attenuated and/or absorbed by the elastic member 670a. Note that in the event that the edge face of the vibration suppression member 670 protrudes from the edge face of the optical low-pass filter 410 (protrusion amount C>0), the clearance Y may be 0.

Also, in the event that the optical low-pass filter retaining member 420 is a material with a small Young's modulus such as urethane foam or rubber material, i.e., a soft material, the clearance Y and clearance Z may each be 0. That is to say, the optical low-pass filter retaining member 420 may be allowed to come into contact with the vibration suppression member 670. This is because a material with a small Young's modulus, i.e., a soft material, will not impede the effects of the elastic member 670a attenuating and/or absorbing reflected waves.

As described above, advantages the same as with the first embodiment can be had even if the type of vibrations generated in the longitudinal direction of the optical low-pass filter 410 are standing waves, or even if a configuration is used where the number of piezoelectric devices is one.

Modification of Second Embodiment

Next, a modification of the above-described first embodiment will be described with reference to FIGS. 14A and 14B. In the same way as with FIG. 13A, FIG. 14A is a diagram of the state in which the B faces of the piezoelectric devices 430a and 430b have been applied to the imaging device side of the optical low-pass filter 410, as viewed from the imaging device side.

With the second embodiment illustrated in FIGS. 13A and 13B, the vibration suppression member 670 is applied to the outer side of the sealing member 650. In comparison, with the modification shown in FIGS. 14A and 14B, the sealing member 650 and vibration suppression member 670 illustrated in the second embodiment are integrally formed as a vibration suppression member 770. Other points are the same as with the second embodiment, and accordingly description thereof will be omitted.

Figure 14A:
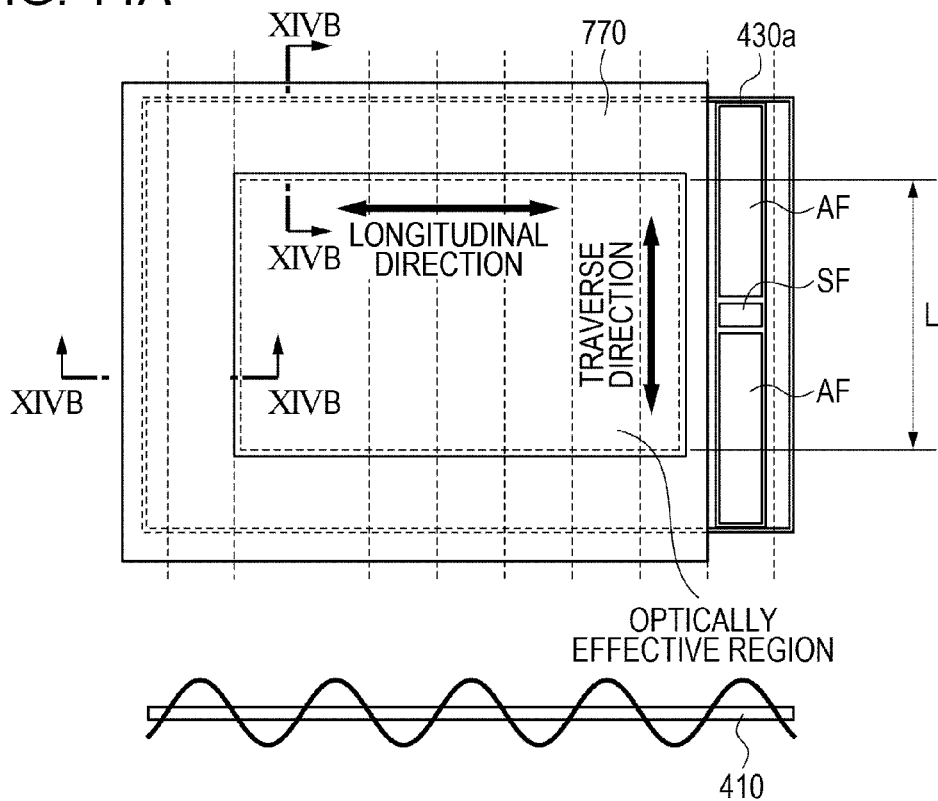
FIGS. 14A and 14B are diagrams illustrating a modification of the second embodiment, where

As illustrated in FIG. 14A, the vibration suppression member 770 has a rectangular shape with an opening formed therein. The vibration suppression member 770 is applied to the optical low-pass filter 410 by double-sided adhesive tape. The vibration suppression member 770 is formed such that the length of the short side is longer than the short side of the optical low-pass filter 410, and the size of the opening formed in the vibration suppression member 770 is greater than the optically effective region. The vibration suppression member 770 is applied to the optical low-pass filter 410 such that the optically effective region of the optical low-pass filter 410 is situated within the opening of the vibration suppression member 770, whereupon the edge faces of the three sides of the vibration suppression member 770 each protrude from the edge faces of the two long sides of the optical low-pass filter 410 and the one short side where the piezoelectric device 430a is not applied. That is to say, the edge faces of the outer sides of the vibration suppression member 770 each protrude out from the edge faces of the sides of the optical low-pass filter 410.

The vibration suppression member 770 is sandwiched between the optical low-pass filter 410 and optical low-pass filter retaining member 420 and is compressed therebetween, whereby the optically effective region of the optical low-pass filter 410 is sealed off.

Figure 14B:
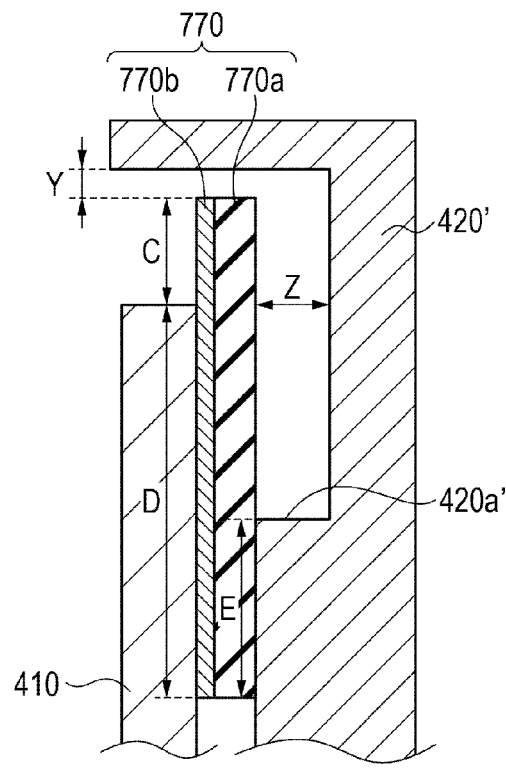

FIG. 14B is a cross-sectional diagram taken along XIVB-XIVB in FIG. 14A. FIG. 14B illustrates, in addition to the optical low-pass filter 410 and piezoelectric devices 430a and 430b, a portion of the optical low-pass filter retaining member 420'. The optical low-pass filter retaining member 420' has a protrusion 420a' formed on the face thereof retaining the optical low-pass filter 410, and holds the optical low-pass filter 410 by this protrusion 420a' coming into contact with a part of the vibration suppression member 770.

As illustrated in FIG. 14B, the vibration suppression member 770 is configured of an elastic member 770a and double-sided tape 770b. The elastic member 770a and double-sided tape 770b are of the same shape, with one face of the double-sided tape 770b being applied to one entire face of the elastic member 770a. The other face of the double-sided tape 770b is applied to the optical low-pass filter 410. Upon the other face of the double-sided tape 770b being applied to the optical low-pass filter 410, the edge face of the vibration suppression member 770 protrudes from the edge face of the optical low-pass filter 410 by a protrusion amount C, as shown in FIG. 14B. The protrusion amount C and adhesion amount D are the same as with the first embodiment, so description will be omitted.

As illustrated in FIG. 14B, the width E region where the protrusion 420a' comes into contact has the same function as the sealing member 650 in the first embodiment.

A clearance Y (Y>0) and a clearance Z (Z>0) such as shown in FIG. 14B are formed between the vibration suppression member 770 and the optical low-pass filter retaining member 420'. That is to say, the optical low-pass filter retaining member 420' holds the optical low-pass filter 410 such that the vibration suppression member 770 and optical low-pass filter retaining member 420' do not come into contact in the vicinity of the side of the optical low-pass filter 410 where the vibration suppression member 770 is applied. This is because in the event that the vibration suppression member 770 comes into contact with a material having a high Young's modulus such as resin or metal or the like, i.e., a hard material, the reflected waves generated at the edge of the optical low-pass filter 410 are not sufficiently attenuated and/or absorbed by the elastic member 770a. Note that in the event that the edge face of the vibration suppression member 770 protrudes from the edge face of the optical low-pass filter 410 (protrusion amount C>0), the clearance Y may be 0.

Also, in the event that the optical low-pass filter retaining member 420' is a material with a small Young's modulus such as urethane foam or rubber material, i.e., a soft material, the clearance Y and clearance Z may each be 0. That is to say, the optical low-pass filter retaining member 420' may be allowed to come into contact with the vibration suppression member 770. This is because a material with a small Young's modulus, i.e., a soft material, will not impede the effects of the elastic member 770a attenuating and/or absorbing reflected waves.

Now, the optical members according to the present invention are not restricted to the optical low-pass filter 410. While a configuration has been described above where vibrations are generated by excitation at a crystal birefringent plate, the material of the birefringent plate is not restricted to crystal, and lithium niobate may be used instead. Also, an arrangement may be made where vibrations are generated by excitation at an optical low-pass filter configured by layering a birefringent plate and phase plate and infrared absorbing filter, or a simple infrared absorbing filter. Further, an arrangement may be made where vibrations are generated by excitation at a simple glass plate disposed in front of the birefringent plate.

While description has been made with the above embodiments regarding an example of applying the present invention to a digital camera, the present invention may also be applied to optical apparatuses such as liquid crystal projectors. In the event that foreign matter such as dust or the like adheres to the face of optical members of a projection optical system with optical apparatuses such as liquid crystal projectors, a shadow of the foreign matter will be projected, and accordingly a configuration similar to that of the embodiments may be made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-026357 filed Feb. 9, 2011, which is hereby incorporated by reference herein in its entirety.

What is claimed is:

1. A foreign substance removal unit comprising:
   a rectangular optical member disposed on an optical path, in which is set an optically effective region through which a light flux passes;
   a piezoelectric device applied to a side of the optical member on the outer side of the optically effective region;
   a vibration suppression member applied to a side of the optical member where the piezoelectric device is not applied; and
   a retaining member arranged to retain the optical member,
   wherein the vibration suppression member is applied to the optical member such that an edge face of the side of the vibration suppression member protrudes outwardly from the edge face of the optical member, and
   wherein the retaining member retains the optical member such that the retaining member does not contact the edge face of the vibration suppression member that is protruding outwardly from the edge face of the optical member.

2. The foreign substance removal unit according to claim 1, wherein the vibration suppression member has a strip-shape of which the length of the long side is longer than the long side of the optically effective region, and
   wherein the vibration suppression member is applied to the optical member such that the long side of the optically effective region is within the range of the long side of the vibration suppression member.

3. The foreign substance removal unit according to claim 1, further comprising:
   a sealing member configured to seal off the optically effective region, being sandwiched between the optical member and the retaining member,
   wherein the vibration suppression member is applied to the optical member so as to be further outwards than the sealing member.

4. The foreign substance removal unit according to claim 1, wherein the vibration suppression member has a rectangular shape in which an opening greater than the optically effective region is formed, and
   wherein the vibration suppression member is applied to the optical member such that the optically effective region is situated within the opening.

5. The foreign matter removal unit according to claim 4, wherein the retaining member holds the optical member, such that the edge face of the vibration suppression member and the retaining member do not come into contact.

6. The foreign substance matter removal unit according to claim 5,
   wherein the vibration suppression member is sandwiched between the optical member and the retaining member, such that the vibration suppression member and the retaining member do not come into contact in the vicinity of the side of the optical member where the vibration suppression member is applied.

7. The foreign substance removal unit according to claim 1, wherein an adhesive face is formed on a region of the vibration suppression member protruding from the edge face of the optical member.

8. The foreign substance removal unit according to claim 1, wherein the piezoelectric device generates by excitation a first flexure vibration and a second flexure vibration at the same time, and
   wherein the second flexure vibration differs in time phase from the first flexure vibration, and also the order of flexure vibration differs by one from the first flexure vibration.

9. The foreign substance removal unit according to claim 1,
   wherein the piezoelectric device generates by excitation a first flexure vibration in a direction orthogonal to the side of the optical member to which the piezoelectric device is applied, such that a first standing wave is generated,
   wherein the piezoelectric device generates by excitation a second flexure vibration in a direction orthogonal to the side of the optical member to which the piezoelectric device is applied, such that a second standing wave is generated, and
   wherein the order of the second flexure vibration differs by one from the first flexure vibration.

10. An optical apparatus comprising:
    a rectangular optical member disposed on an optical path, in which is set an optically effective region through which a light flux passes;
    a piezoelectric device applied to a side of the optical member on the outer side of the optically effective region;
    a vibration suppression member applied to a side of the optical member where the piezoelectric device is not applied; and
    a retaining member arranged to retain the optical member,
    wherein the vibration suppression member is applied to the optical member such that an edge face of the vibration suppression member protrudes outwardly from the edge face of the optical member, and
    wherein the retaining member retains the optical member such that the retaining member does not contact the edge face of the vibration suppression member that is protruding outwardly from the edge face of the optical member.

11. The optical apparatus according to claim 10,
    wherein the vibration suppression member has a strip-shape of which the length of the long side is longer than the long side of the optically effective region, and
    wherein the vibration suppression member is applied to the optical member such that the long side of said optically effective region is within the range of the long side of the vibration suppression member.

12. The optical apparatus according to claim 10, further comprising:
    a sealing member configured to seal off the optically effective region, being sandwiched between the optical member and said retaining member,
    wherein said vibration suppression member is applied to the optical member so as to be further outwards than the sealing member.

13. The optical apparatus according to claim 10,
    wherein the vibration suppression member has a rectangular shape in which an opening greater than the optically effective region is formed, and
    wherein the vibration suppression member is provided to said optical member such that said optically effective region is situated within the opening.

14. The optical apparatus according to claim 13,
    wherein the retaining member holds the optical member, such that the edge face of the vibration suppression member and the retaining member do not come into contact.

15. The optical apparatus according to claim 14,
    wherein the vibration suppression member is sandwiched between the optical member and the retaining member, such that the vibration suppression member and the retaining member do not come into contact in the vicinity of the side of the optical member where the vibration suppression member is applied.

16. The optical apparatus according to claim 10, wherein an adhesive face is also formed on a region of the vibration suppression member protruding from the edge face of the optical member.

17. The optical apparatus according to claim 10, wherein the piezoelectric device generates by excitation a first flexure vibration and a second flexure vibration at the same time, and
wherein the second flexure vibration differs in time phase from the first flexure vibration, and the order of flexure vibration differs by one from the first flexure vibration.

18. The optical apparatus according to claim 10, wherein the piezoelectric device generates by excitation a first flexure vibration in a direction orthogonal to the side of the optical member to which the piezoelectric device is applied, such that a first standing wave is generated,
wherein the piezoelectric device generates by excitation a second flexure vibration in a direction orthogonal to the side of the optical member to which the piezoelectric device is applied, such that a second standing wave is generated, and
wherein the order of the second flexure vibration differs by one from the first flexure vibration.

* * * * *